United States Patent
Tsuchiya et al.

(10) Patent No.: US 10,035,208 B2
(45) Date of Patent: Jul. 31, 2018

(54) METHOD OF FORMING FILLET ARC WELDED JOINT AND FILLET ARC WELDED JOINT

(71) Applicant: NIPPON STEEL & SUMITOMO METAL CORPORATION, Tokyo (JP)

(72) Inventors: Shoko Tsuchiya, Tokyo (JP); Shinji Kodama, Tokyo (JP); Yuuichi Yosida, Tokyo (JP); Yoshinari Ishida, Tokyo (JP); Masahiro Ogawa, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 264 days.

(21) Appl. No.: 14/408,509

(22) PCT Filed: Nov. 28, 2013

(86) PCT No.: PCT/JP2013/082070
§ 371 (c)(1),
(2) Date: Dec. 16, 2014

(87) PCT Pub. No.: WO2014/084317
PCT Pub. Date: Jun. 5, 2014

(65) Prior Publication Data
US 2015/0196967 A1    Jul. 16, 2015

(30) Foreign Application Priority Data
Nov. 29, 2012 (JP) .................................. 2012-261421

(51) Int. Cl.
*B23K 9/00* (2006.01)
*B23K 9/02* (2006.01)
(Continued)

(52) U.S. Cl.
CPC ............ *B23K 9/0043* (2013.01); *B23K 9/025* (2013.01); *B23K 9/028* (2013.01); *B23K 9/23* (2013.01);
(Continued)

(58) Field of Classification Search
CPC ........... Y10T 29/49622; Y10T 403/477; Y10T 403/478; Y10T 403/479; E04B 2001/2415;
(Continued)

(56) References Cited

U.S. PATENT DOCUMENTS 4,129,974 A * 12/1978 Ojalvo ...................... E04C 3/06
29/897.35
4,280,541 A * 7/1981 Reimler ..................... B27L 1/05
144/208.8
(Continued)

FOREIGN PATENT DOCUMENTS

JP    51-14844 A    2/1976
JP    62-259676 A   11/1987
(Continued)

OTHER PUBLICATIONS

Extended European Search Report, dated Jun. 30, 2016, for corresponding European Application No. 13858775.3.
(Continued)

*Primary Examiner* — Ryan D Kwiecinski
(74) *Attorney, Agent, or Firm* — Birch, Stewart, Kolasch & Birch, LLP

(57) ABSTRACT

Stiffening beads (55A, 55B) are formed in turned portions in a region of a fillet bead (53) formed in a single stroke manner. At this time, it is set in such a manner that welding start positions of the stiffening beads (55A, 55B) are in a region near the fillet bead and do not exist independently without mixing with other weld beads.

14 Claims, 9 Drawing Sheets

(51) Int. Cl.
*B23K 9/23* (2006.01)
*B23K 9/025* (2006.01)
*B23K 9/028* (2006.01)
B23K 101/18 (2006.01)
B23K 103/04 (2006.01)
B23K 101/00 (2006.01)

(52) U.S. Cl.
CPC .... *B23K 2201/006* (2013.01); *B23K 2201/18* (2013.01); *B23K 2203/04* (2013.01); *B23K 2203/05* (2015.10); *B60G 2206/8201* (2013.01); *Y10T 403/479* (2015.01)

(58) Field of Classification Search
CPC ...... B62K 19/20; B23K 9/0043; B23K 9/028; B23K 9/025; B23K 9/23; B23K 2203/04
See application file for complete search history.

(56) References Cited

U.S. PATENT DOCUMENTS

| | | | | |
|---|---|---|---|---|
| 5,084,119 | A * | 1/1992 | Barksdale | C09J 5/10 156/157 |
| 5,233,149 | A * | 8/1993 | Killian | B23K 33/00 219/137 R |
| 6,099,194 | A * | 8/2000 | Durand | B62D 21/02 296/204 |
| 6,696,174 | B2 * | 2/2004 | Cercone | B23P 6/00 138/97 |
| 9,227,271 | B2 * | 1/2016 | Kushiyama | B23K 9/0043 |
| 2005/0252888 | A1 * | 11/2005 | Ohta | B23K 9/028 219/74 |
| 2006/0163231 | A1 * | 7/2006 | Kobayashi | B23K 35/308 219/146.23 |
| 2013/0153092 | A1 * | 6/2013 | Kasuya | B23K 9/02 148/524 |
| 2014/0301776 | A1 * | 10/2014 | Shiga | B23K 9/23 403/272 |
| 2015/0071703 | A1 | 3/2015 | Ishida et al. | |

FOREIGN PATENT DOCUMENTS

| | | |
|---|---|---|
| JP | 6-340947 A | 12/1994 |
| JP | 7-24570 A | 1/1995 |
| JP | 8-155635 A | 6/1996 |
| JP | 9-39829 A | 2/1997 |
| JP | 9-253843 A | 9/1997 |
| JP | 2012-110950 A | 6/2012 |
| KR | 10-2002-0084736 A | 11/2002 |
| WO | WO 2013/157557 A1 | 10/2013 |

OTHER PUBLICATIONS

English translation of the International Preliminary Report on Patentability (forms PCT/IPEA/409 and PCT/IB/338), dated Jun. 4, 2015, for International Application No. PCT/JP2013/082070.
International Preliminary Report on Patentability, dated Sep. 29, 2014, issued in PCT/JP2013/082070.
International Search Report, dated Feb. 25, 2014, issued in PCT/JP2013/082070.
Written Opinion of the International Searching Authority, dated Feb. 25, 2014, issued in PCT/JP2013/082070.
Korean Office Action with a partial English translation dated Oct. 20, 2015 for corresponding Application No. 10-2015-7007098.

* cited by examiner

METHOD OF FORMING FILLET ARC WELDED JOINT AND FILLET ARC WELDED JOINT

TECHNICAL FIELD

The present invention relates to a method of forming a fillet arc welded joint and a fillet arc welded joint, and is preferred to be used particularly for fillet arc welding plural metal members.

BACKGROUND ART

In the automotive field, for example, improvement in collision safety is required together with improvement in fuel consumption by weight reduction of vehicle bodies for environmental conservation. Thus, use of high-strength steel sheets for thickness reduction and optimization of vehicle body structures have been practiced hitherto in various ways, so as to achieve weight reduction of vehicle bodies and improvement in collision safety.

Large fatigue strength is also required in the high-strength steel sheets for weight reduction of vehicle bodies. In general, the fatigue strength of a parent material to be used for a welded member increases in proportion to steel sheet strength, but it is known that the fatigue strength of a welded joint barely increases even when the steel sheet strength is increased. This hinders the weight reduction of vehicle bodies by use of the high-strength steel sheets.

For underbody members such as suspension arms and sub-frames in particular, the fatigue strength of welded portions becomes more important. Fillet arc welding is often used for welding of these underbody members. Thus, in order to achieve the weight reduction of underbody members, an increase in fatigue strength of fillet arc welded joints becomes an issue.

FIG. 1 shows a cross-sectional shape of a typical lap fillet welded joint formed by overlapping an upper steel product 1 and a lower steel product 2 and welding only a corner portion of one side of corner portions formed on both sides of an abutted portion of the upper steel product 1 and the lower steel product 2. In such a lap fillet welded joint, stress is concentrated in a toe portion 4 and a root portion 5 of a fillet weld bead 3 and a fatigue crack progresses in a direction vertical to a load, and thereby the welded joint is broken. Therefore, for improvement in fatigue strength, decreasing the stress concentration in the toe portion 4 and the root portion 5 becomes important. Incidentally, in the following explanation, the fillet weld bead is referred to as a fillet bead as necessary.

Conventionally, as a means of improving fatigue strength of a fillet welded joint, welding a reinforcing member such as a rib into/to a proper shape • position, finishing a toe portion of a weld bead by a grinder operation, decorative build-up welding, and the like, and the like are performed. However, welding an additional member leads to an increase in cost. Further, additional work is required for the finishing of the toe portion. Thus, these means are not techniques applicable to manufacture of mass-produced goods such as automobile parts.

Further, in terms of a welding method, a technique of decreasing stress concentration to a toe portion is proposed in Patent Literatures 1 and 2.

In Patent Literature 1, there is disclosed a method of decreasing stress concentration to a toe portion and improving fatigue strength by optimizing chemical components of a weld metal to increase a curvature radius of the toe portion.

In Patent Literature 2, there is disclosed a weld bead structure in which a weld bead is extended when an end surface of another steel sheet is butted against one surface of a steel sheet to have a T-shaped cross section and a fillet bead is formed on both sides of the butted portion.

In Patent Literature 3, there is disclosed that when a sheet surface of a plate-shaped member and a square member are butted and fillet welding is performed with respect to all the portions of edges of the square member in contact with the plate-shaped member, linear welded portions intersecting crosswise each other are formed on corner portions of the square member.

However, even with the techniques disclosed in Patent Literatures 1 to 3, it is not possible to expect the effect of decreasing the stress concentration to the root portion 5 of the typified lap fillet welded joint formed by welding only one side of the overlapped portion of the steel sheets 1 and 2 shown in FIG. 1.

Further, in the technique disclosed in Patent Literature 2, the weld bead is extended, and thereby fatigue strengths at a welding start point (start edge portion) of the weld bead and at a welding end point (end edge portion) of the weld bead improve. However, there is little effect for improvement in fatigue strength of an intermediate portion of the weld bead.

Further, in the technique disclosed in Patent Literature 3, the number of welding start points to remain independently near a fillet bead is increased. The shape of a toe portion at a welding start point projects and this projected angle is steep, so that stress is easily concentrated at the welding start point if the welding start point exists independently.

As above, in the techniques disclosed in Patent Literatures 1 to 3, it is not easy to suppress occurrence of fatigue fracture when a welded structure member to which a cyclic load is applied such as an automobile underbody member is formed by fillet welding metal sheets having a thin sheet thickness.

CITATION LIST

Patent Literature

Patent Literature 1: Japanese Laid-open Patent Publication No. 06-340947
Patent Literature 2: Japanese Laid-open Patent Publication No. 09-253843
Patent Literature 3: Japanese Laid-open Patent Publication No. 51-14844

SUMMARY OF INVENTION

Technical Problem

Thus, the present invention has an object to make it possible to suppress occurrence of a crack caused by fatigue of a welded structure member formed by fillet welding metal members having a thin sheet thickness.

Solution to Problem

A method of forming a fillet arc welded joint of the present invention is a method of forming a fillet arc welded joint by fillet arc welding at least a partial region of corner portions that are edge regions of an abutted portion of at least one of a sheet surface portion and a sheet thickness portion of one metal member and a sheet surface portion of the other metal member and have at least one turned portion at at least one portion thereof, the method including: forming a fillet bead with respect to a region containing the turned portion of the corner portion by the fillet arc welding; and forming a stiffening bead on one place or plural places of at least the one turned portion by arc welding different from the fillet arc welding so that a welding start point or a welding end point of the stiffening bead overlaps with the fillet bead, in which the stiffening bead is formed in a direction of, of the one metal member and the other metal member, the metal member in which a larger tensile stress occurs when, to a fillet arc welded joint formed under the same condition as that of the fillet arc welded joint except for the point that the stiffening bead is not formed, a cyclic load expected to be applied to the fillet arc welded joint is applied, and at least one metal member of the one metal member and the other metal member is formed of a metal sheet having a sheet thickness of 3.2 mm or less.

A fillet arc welded joint of the present invention is a fillet arc welded joint formed by fillet arc welding at least a partial region of corner portions that are edge regions of an abutted portion of at least one of a sheet surface portion and a sheet thickness portion of one metal member and a sheet surface portion of the other metal member and have at least one turned portion at at least one portion thereof, the fillet arc welded joint including: a fillet bead formed with respect to a region containing the turned portion of the corner portion by the fillet arc welding; and a stiffening bead formed on one place or plural places of at least the one turned portion by arc welding different from the fillet arc welding, in which the stiffening bead is formed so that a welding start point or a welding end point of the stiffening bead overlaps with the fillet bead, and is formed in a direction of, of the one metal member and the other metal member, the metal member in which a larger tensile stress occurs when, to a fillet arc welded joint formed under the same condition as that of the fillet arc welded joint except for the point that the stiffening bead is not formed, a cyclic load expected to be applied to the fillet arc welded joint is applied, and at least one metal member of the one metal member and the other metal member is formed of a metal sheet having a sheet thickness of 3.2 mm or less.

Advantageous Effects of Invention

According to the present invention, it is possible to suppress occurrence of a crack caused by fatigue of a welded structure member formed by fillet welding metal members having a thin sheet thickness.

DESCRIPTION OF EMBODIMENTS

Figure 1:
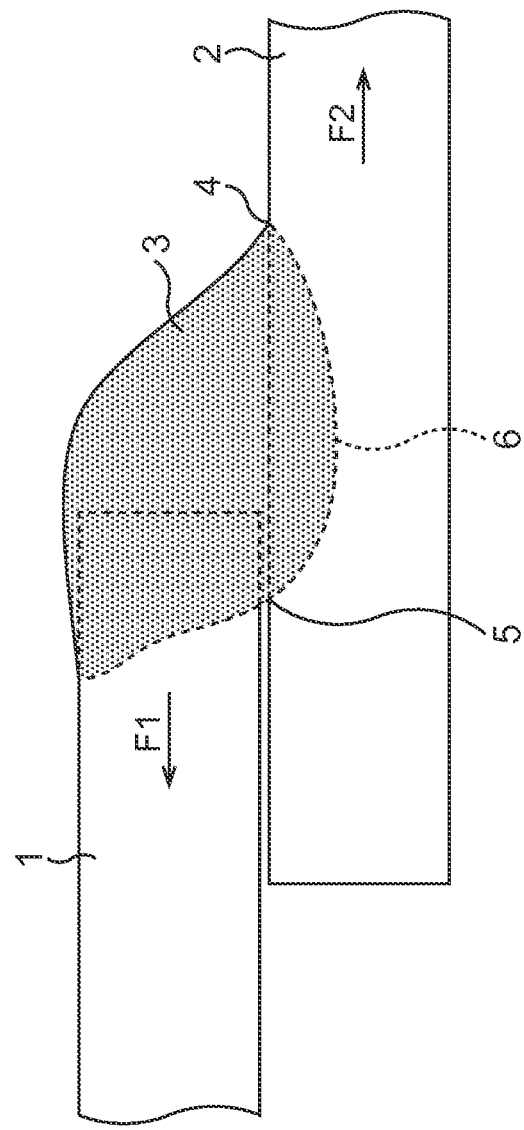
FIG. 1 is a view showing a cross-sectional shape of a lap fillet welded joint.

There will be explained embodiments of a fillet arc welded joint and a method of forming the same of the present invention in detail by using the drawings.

When thin steel sheets for automobile are fillet welded, for example, a fillet bead is sometimes placed only (not on front and rear sides) but on one side of the thin steel sheets in terms of productivity.

When a sheet thickness portion of one thin steel sheet is abutted on a sheet surface portion of the other thin steel sheet to be fillet welded, for example, it is common that fillet arc welding is designed to be performed only on a corner portion of one side of corner portions formed on both sides of the abutted portion of the one thin steel sheet and the other thin steel sheet (see FIG. 5 to FIG. 8 that will be described later).

Further, even when a sheet surface portion of one thin steel sheet is abutted on a sheet surface portion of the other thin steel sheet to be lap fillet welded, it is common that fillet arc welding is designed to be performed only on a corner portion of one side of corner portions formed on both sides of the abutted portion of the one thin steel sheet and the other thin steel sheet (see FIG. 9 and FIG. 10 that will be described later).

This is because there is a problem that when the one side (front side) of the corner portion (a joined portion) is fillet welded and then the opposite side (rear side) of the sheets is soon fillet welded, the steel sheet itself melts down because the steel sheets are not cooled down due to thin sheet thickness.

Incidentally, the corner portion (joined portion) is an edge region of an abutted portion of at least one of a sheet surface portion and a sheet thickness portion of one metal member and a sheet surface portion of the other metal member. The fillet arc welding is performed with respect to at least a partial region of such a corner portion (joined portion).

Thus, the present inventors conducted a fatigue test on a welded structure member in which of corner portions (joined portions) formed on both sides of an abutted portion of two steel members, at least one of the steel members set to a thin steel sheet having a sheet thickness of 3.2 mm or less, only the corner portion (joined portion) of one side is fillet welded. As a result, it was turned out that a fatigue crack sometimes occurs in a fillet bead of such a welded structure member. In the following explanation, the corner portion (joined portion) of one side of the corner portions (joined portions) formed on both sides of the abutted portion of the two steel members will be referred to as a "corner portion (joined portion) of one side" according to need.

As described above, the welded structure member such as an underbody member has a welded place where not corner portions (joined portions) of both sides but a corner portion (joined portion) of one side is fillet welded due to the structure of the member. It is expected that the fatigue crack is likely to occur in such a welded place. Thus, the present inventors examined a cause of occurrence of a fatigue crack and a means of suppressing occurrence of a fatigue crack by taking a basic lap fillet welded joint as an example.

Here, a lap fillet welded joint in which only a corner portion of one side of an overlapped portion of steel sheets 1 and 2 shown in FIG. 1 is fillet arc welded was set as an object of the examination. The present inventors analyzed how the steel sheets 1 and 2 are deformed by using a three-dimensional finite element method when on a fillet bead 3 formed by fillet arc welding, a tensile force F1 acts along the upper steel sheet 1 and a tensile force F2 acts along the lower steel sheet 2.

As a result, it was found that a large bending moment occurs by a displacement between a center axis of the upper steel sheet 1 (a line passing through the centers of the thickness and the width of the steel sheet and parallel to the longitudinal direction of the steel sheet) and a center axis of the lower steel sheet 2, and the lower steel sheet 2 bends in the vicinity of the fillet bead 3, and thus a root portion 5 opens. This conceivably increases a stress concentration to the root portion 5 and causes the occurrence of a fatigue crack.

Thus, the present inventors further examined a means of suppressing the bending of the lower steel sheet 2.

Figure 2:
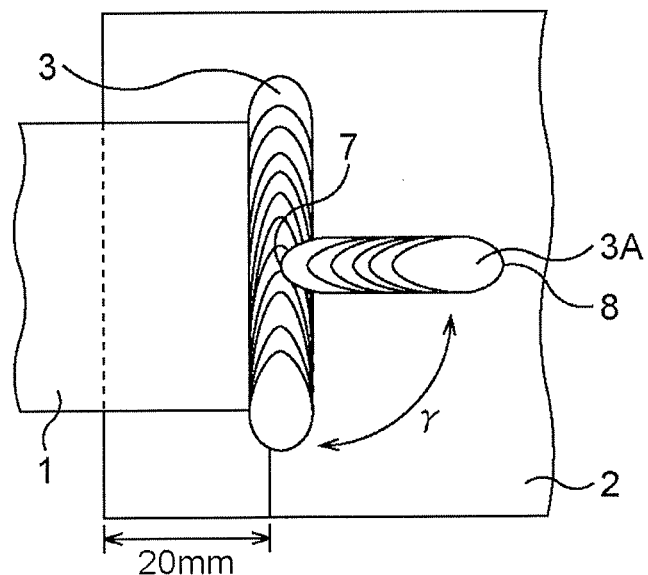
FIG. 2 is a view showing a test piece on which a lap fillet welded joint is formed.

As a result, it was confirmed that the occurrence of a fatigue crack can be suppressed as long as welding is performed as shown in FIG. 2. That is, in addition to the fillet arc welding, another arc welding is performed in such a manner that the position of a welding start point 7 overlaps with the fillet bead 3 and the position of a welding end point 8 is positioned on the front surface of the lower steel sheet 2, and in addition to the fillet bead 3, another arc weld bead (a stiffening bead 3A) is formed. As long as this is applied, the stiffening bead 3A functions as a member of increasing stiffnesses of the steel sheet and a weld metal against the direction in which the above-described bending moment is applied, to thereby be able to suppress the bending of the lower steel sheet 2. Thus, it is possible to suppress the occurrence of a fatigue crack. This is because the bead shape of a start edge portion of the weld bead becomes a projecting shape, whereas the bead shape of an end edge portion becomes flat and the stress concentration in the end edge portion decreases, as described above.

Further, the reason why the welding end point of the stiffening bead 3A is positioned on the lower steel sheet 2 is because a compression stress acts on the front surface of the upper steel sheet 1, and a tensile stress acts on the front surface of the lower steel sheet 2. That is, the stiffening bead 3A is formed in the direction of, of the steel sheets 1 and 2, the steel sheet in which a larger tensile stress acts when to a welded structure member without the stiffening bead 3A formed thereon, a cyclic load expected to be applied to the welded structure member is applied.

Incidentally, in each of the drawings, a place where a region of an entire ellipse is seen is shown as the welding end point.

Next, actual test pieces were made to examine effects of the stiffening bead.

As the test pieces, there was fabricated a test piece A, in which an upper steel sheet 1 having a sheet thickness of 2.3 mm and having a sheet width of 35 mm was overlapped on a lower steel sheet 2 having a sheet thickness of 2.3 mm and having a sheet width of 60 mm with an overlapping portion of 20 mm from above, the overlapped portion was fillet arc welded, and then a fillet bead 3 having a width of 7 mm and having a length of 40 mm was formed on an end portion of the upper steel sheet 1.

Next, there was fabricated a test piece B, in which in addition to the fillet bead 3, a stiffening bead 3A having a length of 10 mm and having a width of 6 mm was further formed by bead-on welding so as to partially overlap with a center portion of the fillet bead 3 with the fillet bead 3 being a welding start point (see FIG. 2).

A fatigue test of these test pieces A and B was conducted.

Figure 3:
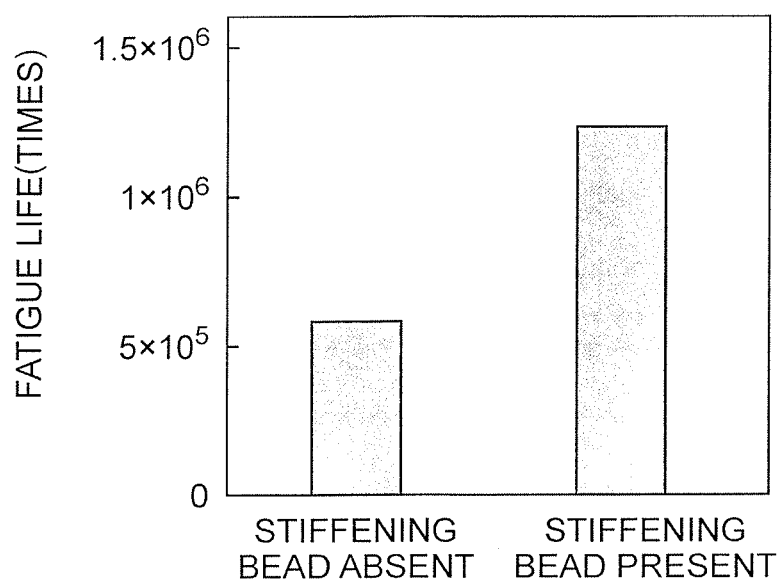
FIG. 3 is a view showing fatigue lives (times) of the case when no stiffening bead is disposed and the case when a stiffening bead is disposed.

As a result, as shown in FIG. 3, it was confirmed that fatigue strength of a joint improves when the stiffening bead is formed in the middle of the fillet bead.

Further, changes of a fatigue life according to a magnitude relation between hardnesses (Vickers hardnesses) of the stiffening bead and the steel sheet were examined.

Steel sheets 1 and 2 each having a hardness of 182 Hv were used and a weld metal having a hardness Hw of 150 Hv was used, to thereby form a test piece C similar to the above-described test piece A, and a fatigue test was conducted.

Further, steel sheets 1 and 2 each having a hardness of 192 Hv were used and weld metals having the hardnesses Hw of 150, 183, and 270 respectively were used, to thereby form test pieces D, E, and F similar to the above-described test piece B, and a fatigue test was conducted.

Figure 4:
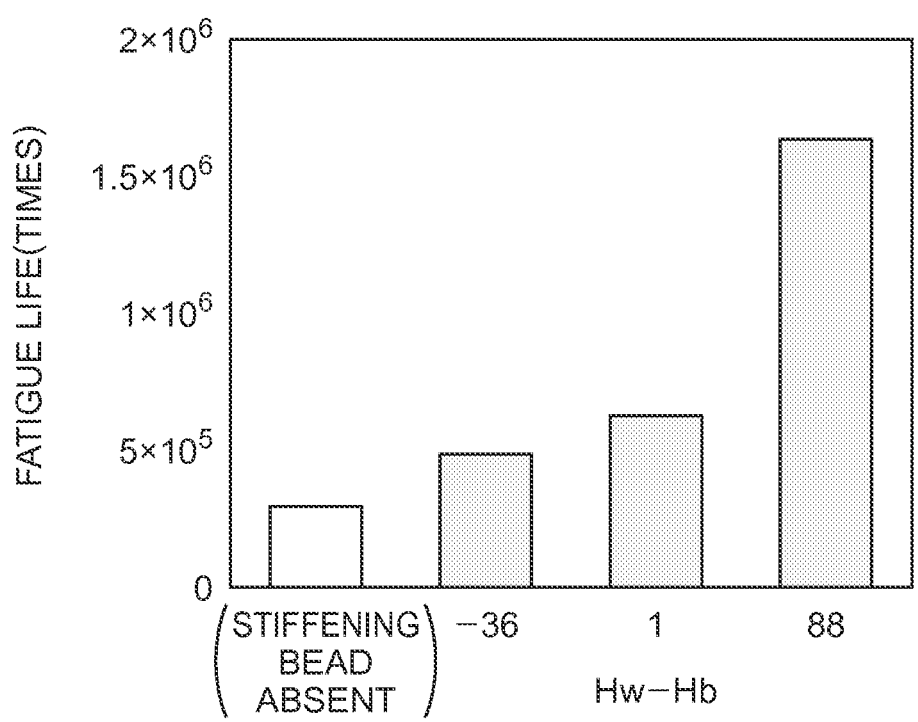
FIG. 4 is a view showing fatigue lives (times) according to a difference between a hardness of a stiffening bead and a steel sheet maximum hardness.

As a result, as shown in FIG. 4, it was found that by providing the stiffening bead, the fatigue life improves, and further when the hardness Hw of the stiffening bead is larger than a steel sheet maximum hardness Hb, the fatigue life further improves.

Incidentally, in FIG. 4, "−36", "1", and "88" each indicate a value obtained by subtracting the steel sheet maximum hardness Hb from the hardness Hw of the stiffening bead. Further, the steel sheet maximum hardness Hb and the hardness Hw of the stiffening bead will be described later.

Further, as is a welded joint having a T-shaped cross section, one obtained by welding corner portions of a fillet arc welded joint formed by a sheet thickness portion and a sheet surface portion being joined is common. In this case as well, depending on the shape of a steel member, there may be a case where only a corner portion of one side can be welded. The present inventors confirmed that fillet arc welding can be treated similarly to lap fillet arc welding even when fillet arc welding is performed only on a corner portion of one side of such a fillet arc welded joint.

The effects obtained by the stiffening bead were confirmed as above, and thus they subsequently examined application of this means of increasing stiffness of a steel member by the stiffening bead to fillet welding of welded structure members.

With regard to welded structure members for automobile, particularly welded structure members for underbody, the ones in which a sheet and a sheet are simply overlapped to be fillet welded, such as the above-described test pieces, and the like are not many, there are members having various shapes, and further there are various directions in which a cyclic load is applied. As a result that they examined a forming method of a stiffening bead effective for such welded structure members, it was turned out that it is effective to form a stiffening bead on one place or plural places of a region of a turned portion, being a portion having a bent weld line, (first region) of a region of a fillet bead formed in a single stroke manner.

Particularly, it was turned out that it is effective to form a stiffening bead on one place or plural places of at least one region of a bent portion and a curved portion of the weld line (second region) of the region of the fillet bead formed in a single stroke manner.

Further, it was turned out that when a welding start point and a welding end point of the fillet bead are not connected and the welding start point of the fillet bead is positioned at a position different from the welding end point, it is effective to form a stiffening bead on one place or plural places of a region where magnitude of a maximum principal stress (tensile stress) is larger than at the welding start point of the fillet bead (third region) of the above-described first region or second region.

Particularly, it was turned out that when the welding start point side of the fillet bead is extended from a corner portion of steel products, it is effective to form a stiffening bead on one place or plural places of such a third region.

Further, it was turned out that it is effective to form a stiffening bead in a region where a fatigue crack first occurs when a cyclic stress expected to be applied to a welded structure member with no stiffening bead formed thereon is applied to the welded structure member (fourth region) of the above-described first region, second region, or third region. The place where a fatigue crack first occurs corresponds to the place where magnitude of a maximum principal stress becomes maximum (a tensile stress becomes maximum).

Particularly, when the curvature of the weld line of the fillet bead is constant, it is effective to form a stiffening bead in such a fourth region.

The stress in the fillet bead can be obtained by finding distribution of stress to occur when a cyclic load is applied to the welded structure member by a FEM stress analysis with the use of three-dimensional CAD, for example. Further, the stress in the fillet bead can also be obtained by conducting a stress application test with the use of an actual welded structure member to examine distribution of strain by using a strain gauge or the like on this occasion.

Hereinafter, there will be explained concrete examples of the case where the stiffening bead is applied to a fillet weld bead by using welded structure members shown in FIG. 5 to FIG. 10. Incidentally, it is set in these examples that a cyclic load is applied in the outline arrow direction shown in each drawing.

Figure 5:
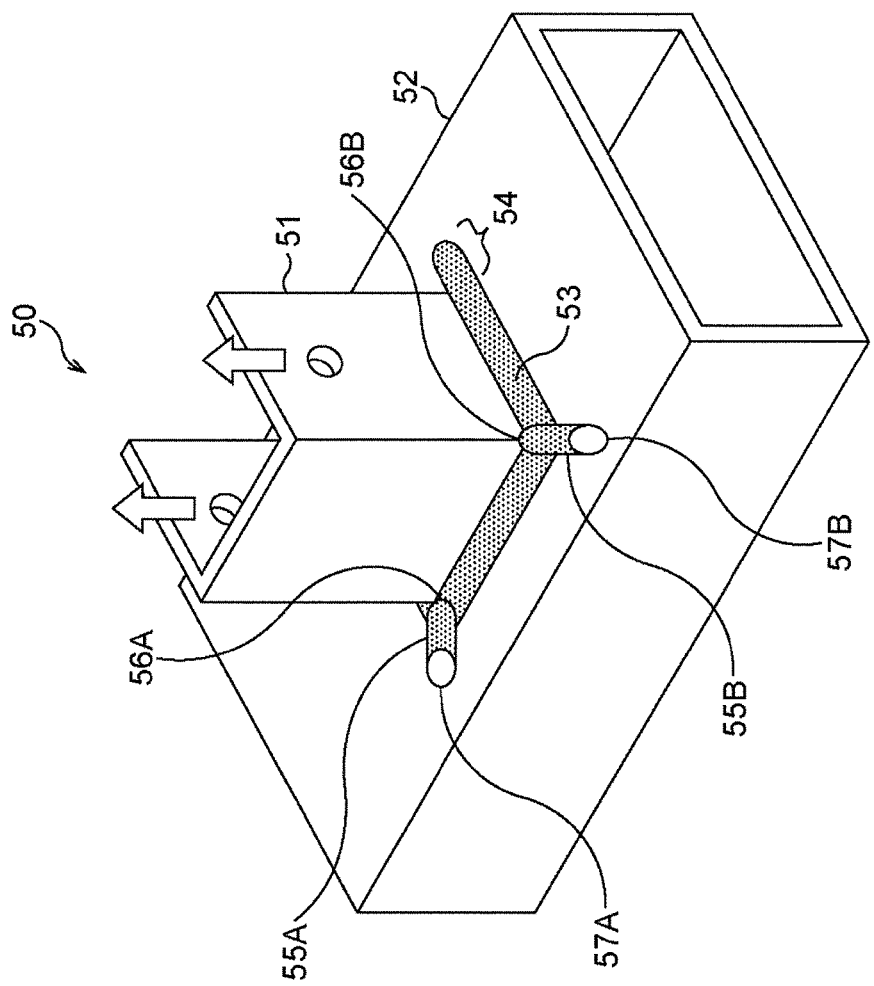
FIG. 5 is a view showing a first example of a welded structure member.

FIG. 5 is a view showing a first example of the welded structure member.

A welded structure member 50 shown in FIG. 5 is formed in a manner that one end portion of a channel product (channel steel) 51 is abutted on one side surface (front surface) of a box product 52 using a square-shaped steel pipe, and of the abutted portion, only the portion positioned outside a sheet surface of the channel product 51 is fillet welded.

As shown in FIG. 5, when a fillet bead 53 is formed, an extended bead 54 is formed in a manner that a region of one end of the abutted portion positioned outside the sheet surface of the channel product 51 of the abutted portion of the channel product 51 and the box product 52 is not set to its welding start point, but a position only a constant distance away from the region along the abutted portion is set to its welding start point rather than the region, and then the fillet bead 53 is formed continuously. In the same manner, the fillet bead 53 is formed in a manner that a region of the other end of the abutted portion is not set to its welding end point, but a position only a constant distance away from the region along the abutted portion is set to its welding end point rather than the region, and then an extended bead is formed continuously.

There are two bent portions in the fillet bead 53 formed on the welded structure member 50. Here, it is set that when a cyclic load expected to be applied to the welded structure member 50 is applied to the welded structure member 50 with no stiffening bead formed thereon, magnitude of the maximum principal stress becomes larger in the bent portions (corner portions of the channel product (channel steel) 51) than at the welding start position of the fillet bead 53 (extended bead).

Further, here, it is set that the place where a fatigue crack first occurs when a cyclic load expected to be applied to the welded structure member 50 is applied to the welded structure member 50 with no stiffening bead formed thereon is the bent portions.

Thus, here, stiffening beads 55A and 55B are formed respectively so that the two bent portions of the fillet bead 53 become their welding start point 56A and 56B and the front surface of the box product 52 becomes their welding end point 57A and 57B. Forming the single stiffening bead in each place is sufficient.

Figure 6:
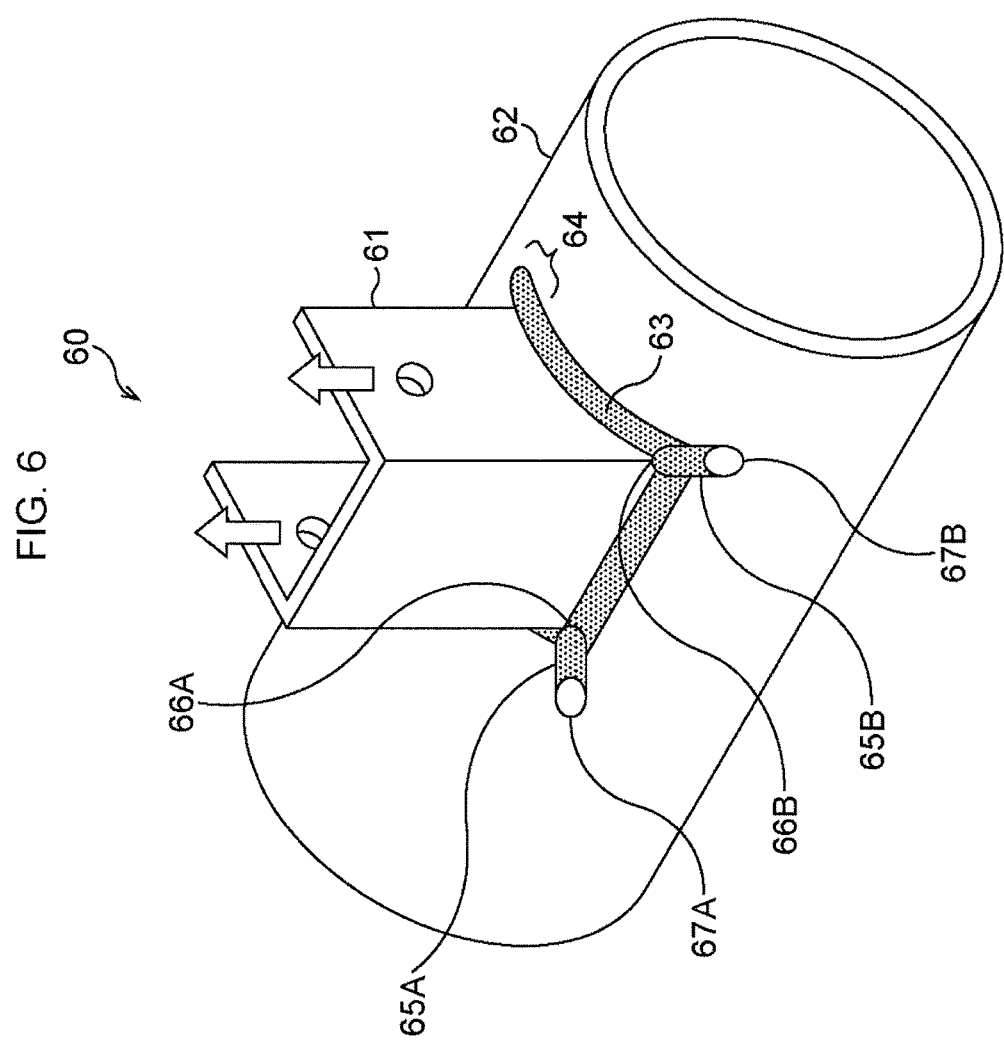
FIG. 6 is a view showing a second example of the welded structure member.

FIG. 6 is a view showing a second example of the welded structure member.

A welded structure member 60 shown in FIG. 6 is formed in a manner that on the front surface of a pipe-shaped box product 62 using a circular steel pipe, one end portion of a channel product (channel steel having one end processed in accordance with the shape of the pipe product) 61 is abutted, and of the abutted portion, only the portion positioned outside a sheet surface of the channel product 61 is fillet welded.

As shown in FIG. 6, when a fillet bead 63 is formed, an extended bead 64 is formed in a manner that a region of one end of the abutted portion positioned outside the sheet surface of the channel product 61 of the abutted portion of the channel product 61 and the box product 62 is not set to its welding start point, but a position only a constant distance away from the region along the abutted portion is set to its welding start point rather than the region, and then the fillet bead 63 is formed continuously. In the same manner, the fillet bead 63 is formed in a manner that a region of the other end of the abutted portion is not set to its welding end point, but a position only a constant distance away from the region along the abutted portion is set to its welding end point rather than the region, and then an extended bead is formed continuously.

There are two bent portions also in the fillet bead 63 formed on the welded structure member 60 similarly in the weld bead 53 shown in FIG. 5. Thus, here, stiffening beads 65A and 65B are formed respectively so that the positions of the two bent portions of the fillet bead 63 become their welding start point 66A and 66B and the front surface of the box product 62 becomes their welding end point 67A and 67B. Forming the single stiffening bead in each place is sufficient. Further, the fillet bead 63 has a region having the same curvature as that of the box product 62 (constant curvature over 0). It is set in the welded structure member 60 that magnitude of the maximum principal stress becomes larger in the bent portions than in this region, and no stiffening bead is formed in this region here.

Figure 7:
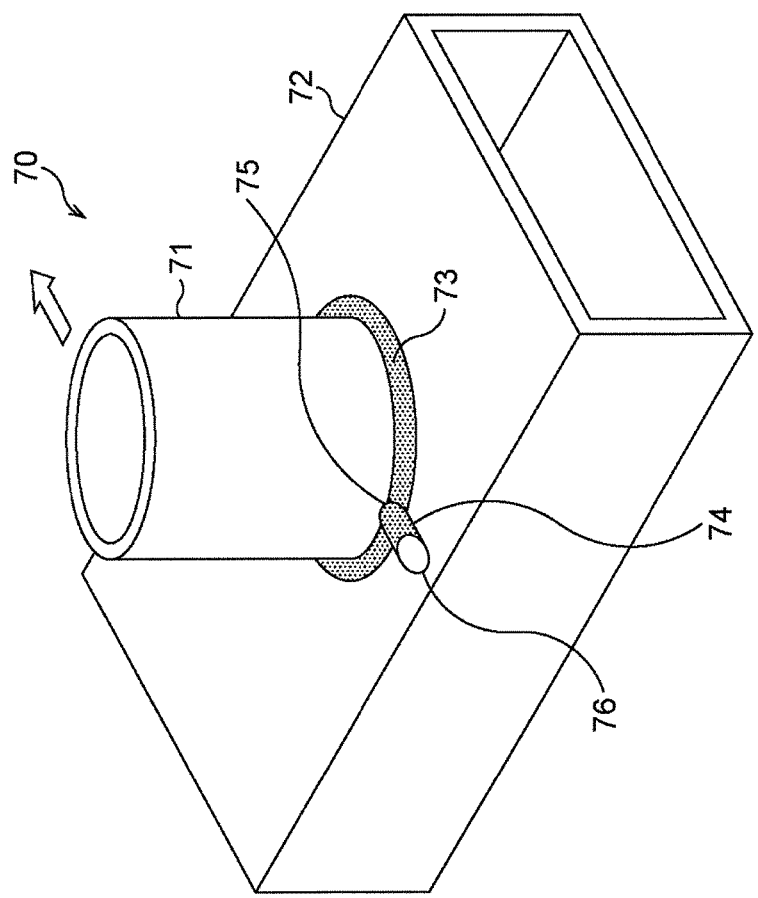
FIG. 7 is a view showing a third example of the welded structure member.

FIG. 7 is a view showing a third example of the welded structure member.

A welded structure member 70 shown in FIG. 7 is formed in a manner that one end portion of a pipe-shaped channel product 71 using a circular steel pipe is abutted on one side surface (front surface) of a box product 72 using a square-shaped steel pipe, and of the abutted portion, only the portion positioned outside a sheet surface of the channel product 71 is fillet welded.

As shown in FIG. 7, a welding start point and a welding end point of a fillet bead 73 are connected, and a start edge portion and an end edge portion do not exist (independently) in the fillet bead 73.

The fillet bead 73 formed on the welded structure member 70 has substantially the same curvature as that of the channel product 71 (constant curvature over 0). Thus, a stiffening bead 74 is formed so that the place where a fatigue crack first occurs when a cyclic load expected to be applied to the welded structure member 70 is applied to the welded structure member 70 with no stiffening bead formed thereon becomes its welding start point 75 and the front surface of the box product 72 becomes its welding end point 76. Concretely, here, the place directly opposite the side where the load is applied is set to the welding start point 75 of the stiffening bead 74. Forming the single stiffening bead in each place is sufficient.

Further, in FIG. 7, the single stiffening bead 74 is disposed in the fillet bead 73. However, in order to further increase strength, for example, each one stiffening bead, two in total, may also be disposed on both sides of the stiffening bead 74 at a constant distance apart from the stiffening bead 74.

Figure 8:
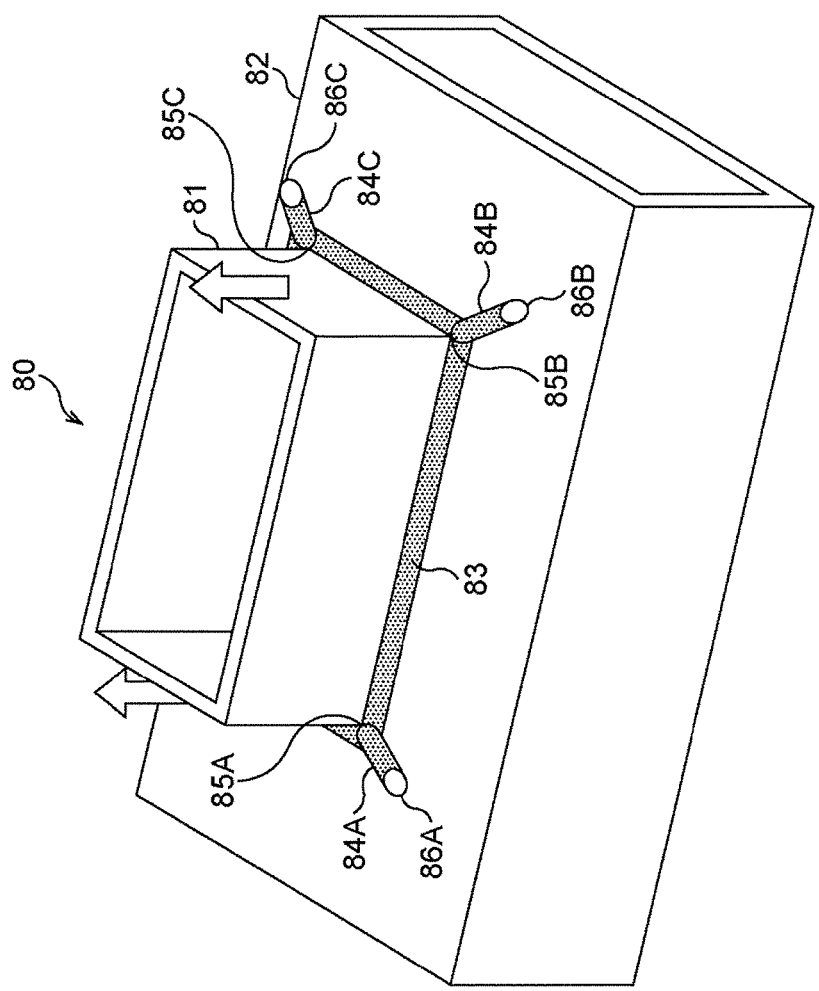
FIG. 8 is a view showing a fourth example of the welded structure member.

FIG. 8 is a view showing a fourth example of the welded structure member.

A welded structure member 80 shown in FIG. 8 is formed in a manner that one end portion of a channel product 81 in which a thin steel sheet is formed into a hollow rectangular parallelepiped shape with an open top surface and an open bottom surface is abutted on one side surface (front surface) of a box product 82 using a square-shaped steel pipe, and of the abutted portion, only the portion positioned outside a steel surface of the channel product 81 is fillet welded.

As shown in FIG. 8, a welding start point and a welding end point of a fillet bead 83 are connected, and a start edge portion and an end edge portion do not exist (independently) in the fillet bead 83.

There are four bent portions in the fillet bead 83 formed on the welded structure member 80. Here, it is set that the place where a fatigue crack first occurs when a cyclic load expected to be applied to the welded structure member 80 is applied to the welded structure member 80 with no stiffening bead formed thereon becomes the bent portions.

Thus, here, stiffening beads 84A, 84B, and 84C are formed respectively so that the positions of the four bent portions of the fillet bead 83 become their welding start point 85A, 85B, and 85C and the front surface of the box product 82 becomes their welding end point 86A, 86B, and 86C. Forming the single stiffening bead in each place is sufficient.

Here, from results of later-described examples (TEST PIECE SYMBOLS C9, D12, C10, and the like in Table 2), the present inventors found that when on the welded structure member in which at least one steel member of steel members to be welded by performing fillet arc welding is formed of a steel sheet having a sheet thickness of 3.2 mm or less, the welding start position of the stiffening bead is not positioned on the fillet bead side but on the box product side, in spite of the stiffening bead being formed, a fatigue life does not improve and sometimes decreases instead. That is, the present inventors found that when the welding start position of the stiffening bead is positioned in a region near the fillet bead and exists independently without mixing with other weld beads, in spite of the stiffening bead being formed, a fatigue life does not improve and sometimes decreases instead.

Thus, in this embodiment, as described above, the welding start position of the stiffening bead is positioned in a region near the fillet bead and does not exist independently without mixing with other weld beads, and the stiffening bead is formed so that the welding start point or the welding end point is positioned in a region overlapping with the fillet bead and in a bent region (turned portion) of a corner portion, which is set as an original understanding.

Further, in the technique described in Patent Literature 3, a weld bead extended from a corner portion and a weld bead in the corner portion are formed in a single stroke manner (namely, these weld beads are formed by the same arc welding). Therefore, the number of welding start points positioned near the fillet bead and existing independently without mixing with other weld beads is increased more than necessary.

In contrast to this, in this embodiment, the stiffening bead is formed in a bent region (turned portion) of a corner portion of a region between the welding start point and the welding end point of the fillet bead formed in a single stroke manner by a single welding operation.

Further, a welding operation of the fillet bead and a welding operation of the stiffening bead are performed separately. That is, it is designed that the fillet bead and the stiffening bead are formed by different arc welding, and the welding start point or the welding end point of the stiffening bead formed to overlap with the fillet bead remains in a state to be distinguished from the fillet bead.

By setting as above, the degree of freedom of the positions of the welding start point and the welding end point of the stiffening bead improves. Thus, it is possible to prevent the number of welding start points positioned near the fillet bead and existing independently without mixing with other weld beads from increasing more than necessary.

FIG. 5 to FIG. 8 above each show an example of the fillet arc welded joint in which a sheet thickness portion of one steel member and a sheet surface portion of the other steel member are joined to each other.

Figure 9:
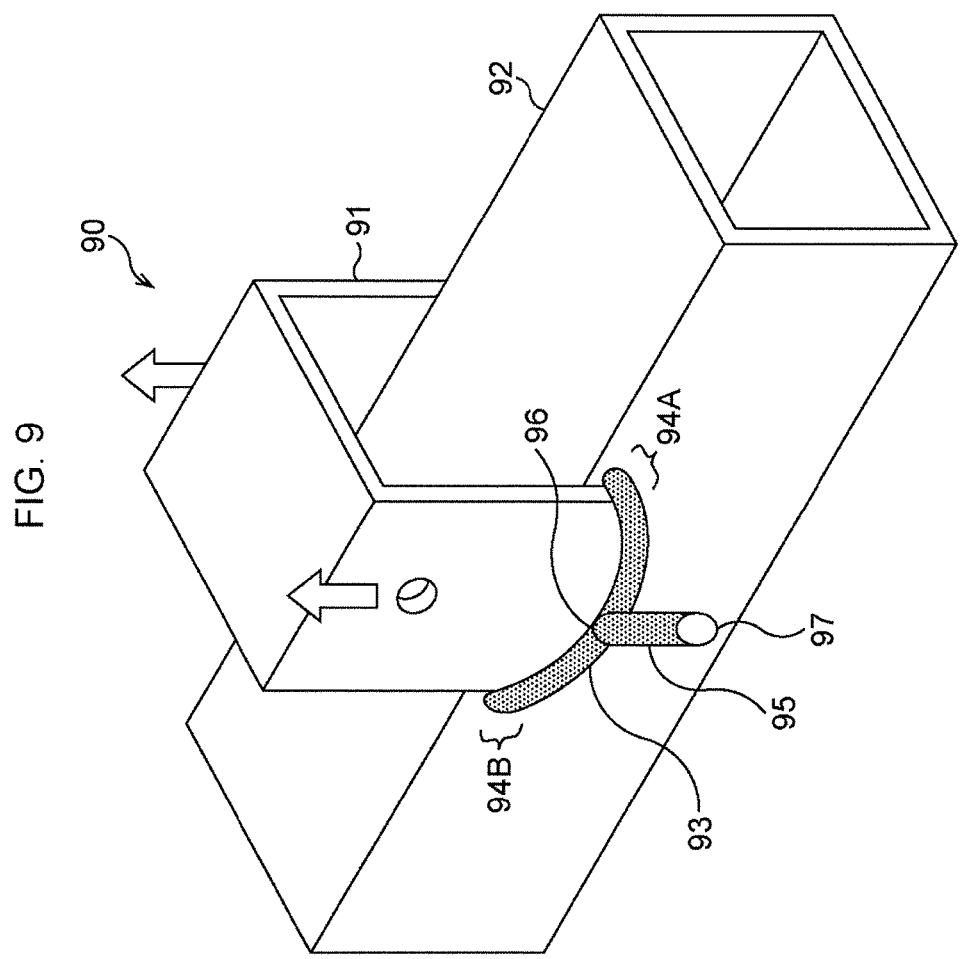
FIG. 9 is a view showing a fifth example of the welded structure member.

FIG. 9 is a view showing a fifth example of the welded structure member.

A welded structure member 90 shown in FIG. 9 is formed in a manner that rear surfaces of flange portions on both sides of a channel product (channel steel processed in such a manner that tips of flange portions on both sides are each curved with a certain curvature) 91 are attached to side surfaces facing each other of a box product 92, and the tips of the flange portions are lap fillet welded. As shown in FIG. 9, when a fillet bead 93 is formed, an extended bead 94A is formed in a manner that one edge region of a boundary between the tip and a base end portion of the flange portion (boundary between the curved region and the other region) is not set to its welding start point, but a position only a constant distance away from the region along the curvature of the curved region is set to its welding start point rather than the region, and then the fillet bead 93 is formed continuously. Similarly, the fillet bead 93 is formed in a manner that the other edge region of the boundary between the tip and the base end portion of the flange portion is not set to its welding end point, but a position only a constant distance away from the region along the curvature of the curved region is set to its welding end point rather than the region, and then an extended bead 94B is formed continuously.

The fillet bead 93 formed on the welded structure member 90 has substantially the same curvature as that of the tip of the flange portion of the channel product 91 (constant curvature over 0). Thus, a stiffening bead 95 is formed so that the place where a fatigue crack first occurs when a cyclic load expected to be applied to the welded structure member 90 is applied to the welded structure member 90 with no stiffening bead formed thereon becomes its welding start point 96 and the front surface of the box product 92 becomes its welding end point 97. Concretely, here, the center portion (deepest portion) in a direction along a weld line of the fillet bead 93 is set to the welding start point 96 of the stiffening bead 95. Forming the single stiffening bead in each place is sufficient.

Further, in FIG. 9, the single stiffening bead 95 is disposed in the deepest portion of the fillet bead 93. However, in order to further increase strength, each one stiffening bead, two in total, may also be disposed in the vicinity of the ⅓ length position and the ⅔ length position of the entire length of the fillet bead 95, for example.

As described above, also on the side opposite the flange portion of the channel product 91, a fillet bead, extended beads, and a stiffening bead are formed in the same manner as that of the fillet bead 93, the extended beads 94A and 94B, and the stiffening bead 95.

FIG. 9 shows an example of the fillet arc welded joint (lap fillet arc welded joint) in which sheet surface portions of one steel member and the other steel member are joined to each other.

Figure 10:
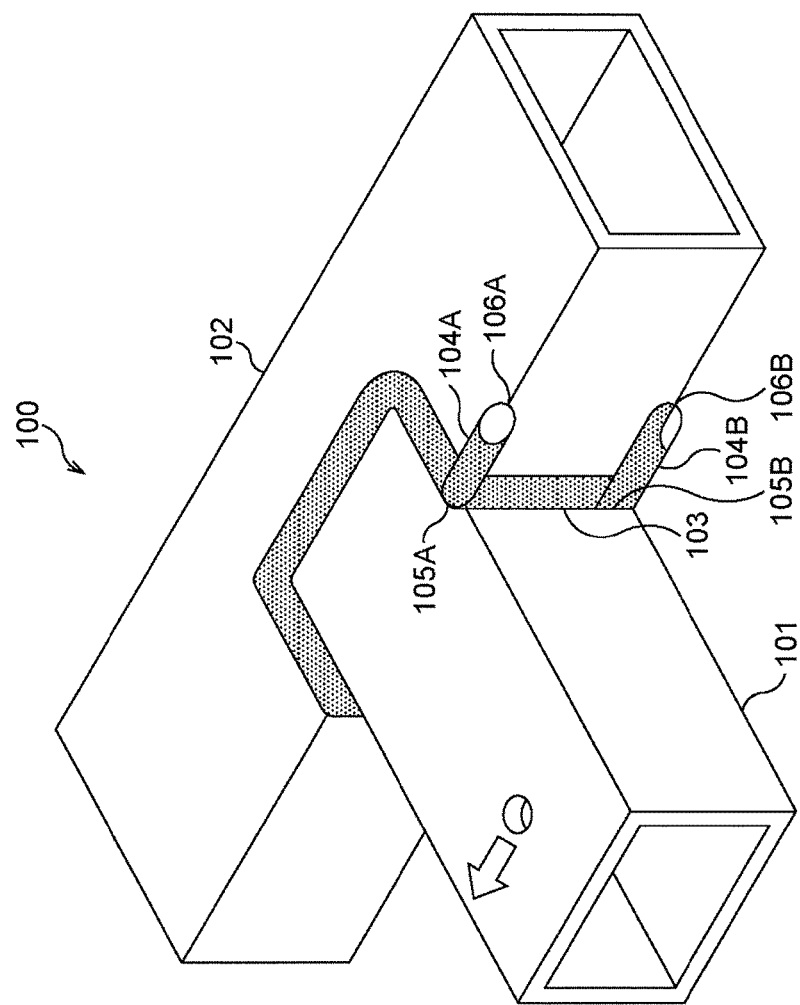
FIG. 10 is a view showing a sixth example of the welded structure member.

FIG. 10 is a view showing a sixth example of the welded structure member.

A welded structure member 100 shown in FIG. 10 is constituted by using a box product 102 using a square-shaped steel pipe and a flange product 101 in which one pair of surfaces of two pairs of surfaces facing each other of a tip portion of a square-shaped steel pipe is cut off to fit the shape of the box product 102. The box product 102 and the flange product 101 are combined so that a rear surface of an uncut portion of the tip portion of the flange product 101 is abutted on the front surface of the box product 102 and a sheet thickness portion of the portion from which the tip portion has been cut off of the flange product 101 is abutted on the front surface of the box product 102 and the abutted portion is fillet welded, and thereby the welded structure member 100 is formed.

There are bent portions in a fillet bead 103 formed on the welded structure member 100. It is set that the place where a fatigue crack first occurs when a cyclic load expected to be applied to the welded structure member 100 is applied to the welded structure member 100 with no stiffening bead formed thereon is the bent portions in a corner portion of the abutted portion of the sheet thickness portion of the portion from which the tip portion has been cut off of the flange product 51 and the front surface of the box product 52.

Thus, here, stiffening beads 104A and 104B are formed respectively so that the positions of these two bent portions of the fillet bead 103 become their welding start point 105A and 105B and the front surface of the box product 102 becomes their welding end point 106A and 106B. Forming the single stiffening bead in each place is sufficient.

FIG. 10 shows an example of the fillet arc welded joint in which a sheet surface portion and a sheet thickness portion of one steel product are both joined to a sheet surface portion of the other steel product. Further, as shown in FIG. 10, it is not necessary to form the stiffening bead with respect to all the bent portions of the corner portion.

In the foregoing, the basic items of this embodiment have been explained, and further respective requirements and preferable requirements for constituting this embodiment will be explained in detail.

(Welded Structure Member)

In this embodiment, a welded structure member (fillet arc welded joint) in which at least one steel member of steel members to be welded by performing fillet arc welding is formed of a steel sheet having a sheet thickness of 3.2 mm or less is targeted. Further, a welded structure member (fillet arc welded joint) to which a cyclic load such as vibration load is applied is targeted.

This is because such a welded structure member is required to improve fatigue strength by a simple means because a fatigue crack is likely to occur in a toe portion or a root portion of a fillet weld bead.

Further, a welded structure member with a corner portion including at least one turned portion is targeted. Further, a welded structure member in which a fillet bead is formed in a single stroke manner so as to contain at least one of turned portions is targeted. The turned portion may be a bent portion or a curved portion. Further, the curvature of the turned portion may be constant, or may also vary. Further, as long as there is at least one fillet bead formed in a single stroke manner, the number of fillet beads to be formed on a single welded structure member may be one, or may also be plural.

As long as such welded structure members are used, it is possible to easily improve the fatigue strength of the welded structure member by subsequently to fillet welding, performing welding for a stiffening bead with the use of a welder and welding materials used for formation of a fillet bead.

(Mode of Disposition of the Stiffening Bead)

The welding start position or the welding end position of the stiffening bead needs to be formed to overlap with the fillet bead. This is because when the stiffening bead is formed separately from the fillet bead, it does not function as a member to increase stiffness of the steel sheet.

In this embodiment, the stiffening bead is formed in a manner that the position overlapping with the fillet bead is set to its welding start point, and of steel members constituting a corner portion (joined portion), the front surface of the steel member having a larger tensile stress act thereon is set to its welding end point, which is set as an original understanding. As described above, this is because at the welding start point, the shape of the toe portion projects and a projected angle is steep, and thus a stress concentration occurs easily.

However, when a stiffening bead is used in common for two independent fillet beads, of the stiffening bead, the welding start point overlaps with the one fillet bead and the welding end point overlaps with the other fillet bead. That is, it is only necessary to set in such a manner that either the welding start point or the welding end point of the stiffening bead overlaps with the fillet bead and the welding start point of the stiffening bead does not exist independently without mixing with other weld beads. This is because if the above is applied, it is possible to suppress projection of the shape of the bead at the position of the welding start point of the stiffening bead.

Further, when the welded structure member has a place where a stress hardly occurs even though a cyclic load is applied, or a place where fracture is unlikely to occur even though a cyclic load is applied and a stress occurs, the place may also be set to the welding start point of the stiffening bead. When the above is applied, the welding start point of the stiffening bead results in existing independently without mixing with other weld beads. This is because if such a place is set to the welding start point of the stiffening bead, fatigue strength of the fillet arc welded joint is not largely affected even though the shape of the bead at the place projects.

Further, the stiffening bead may be formed on the fillet weld bead, or it is also possible to dispose a weld bead corresponding to the stiffening bead in advance before fillet welding and to dispose the fillet bead thereon. That is, as long as the welding start position or the welding end position of the stiffening bead overlaps with the fillet bead, the stiffening bead may be on or under the fillet bead.

On the other hand, in this embodiment, as described above, the welding end point of the stiffening bead is a region of, of steel members constituting a corner portion (joined portion), the steel sheet where a larger tensile stress acts when a cyclic load is applied to the welded structure member, which is set as an original understanding. This is because at the welding end point, the shape of the bead becomes flat, and thus a stress concentration does not occur easily.

The disposition position of the stiffening bead with respect to the fillet bead is one place or plural places in at least one region of the second region, the third region, and the fourth region on the condition that the above-described first region exists. Further, as long as the stiffening bead is disposed in such a region, the stiffening bead may also be disposed in the other regions.

(Length La of the Stiffening Bead)

A length La of the stiffening bead preferably satisfies the following condition (A).

$$\text{Length } La \text{ of stiffening bead} \geq \text{width } W \text{ of fillet bead} \times 2 \quad (A)$$

Here, the length La of the stiffening bead is a length to a melting end of the stiffening bead with a contact point of the fillet bead and the stiffening bead being a starting point.

When the length La of the stiffening bead is short, it is not possible to sufficiently increase stiffness of the steel member and to exhibit the function of improving fatigue strength of the welded joint. If the length La of the stiffening bead projecting from the toe portion of the fillet bead is the width W of the fillet bead or more, the function of improving fatigue strength can be exhibited depending on the degree of a load to be applied to the welded structure member, but in order to further increase stiffness, the length of the stiffening bead is preferably set to two times or more of the width W of the fillet bead.

Further, the upper limit of the length La of the stiffening bead is restricted by the shape • structure of a steel product manufacture by welding. When the length of the fillet bead is set to L, for example, the length La of the stiffening bead can be less than 0.5×L.

(Height Ha of the Stiffening Bead)

A height Ha of the stiffening bead from the front surface of the steel member preferably satisfies the following condition (B) with respect to a thickness t (mm) of the steel member on which the stiffening bead is formed.

$$\text{Height } Ha \text{ of stiffening bead} \geq \text{thickness } t \text{ of steel member} \times 0.5 \quad (B)$$

When the height Ha of the stiffening bead is less than 0.5 times (=t/2) of the thickness t of the steel member on which the stiffening bead is formed, it does not sufficiently exhibit the function as the stiffening bead. The larger the height Ha of the stiffening bead, the larger its effect, but naturally there is a limit to avoid strike through or melt down of the steel sheet. Thus, the height Ha of the stiffening bead is, realistically, equal to or less than the thickness t of the steel member on which the stiffening bead is formed.

(Width Wa of the Stiffening Bead)

Further, a width Wa of the stiffening bead preferably satisfies the following condition (C).

$$\text{Width } Wa \text{ of stiffening bead} \geq \text{width } W \text{ of fillet bead} \times 0.5 \quad (C)$$

When the width Wa of the stiffening bead is less than 0.5 times (W/2) of the width W of the fillet bead, it does not sufficiently exhibit the function as the stiffening bead. The upper limit of the width Wa of the stiffening bead is not defined particularly, but similarly to the height Ha of the stiffening bead, it is necessary to form the stiffening bead within the range that strike through or melt down does not occur, and thus it is determined naturally in this view point.

Incidentally, welding of a welded structure member for automobile is performed by automatic welding by a robot, so that it is efficient to form the stiffening bead by using a welder to form the fillet bead and welding materials as they are, and under the condition, it is possible to obtain an effect of sufficiently improving a fatigue property. However, the fatigue strength to be obtained also varies depending on the welded structure member, so that the length, the width, and the height of the stiffening bead are preferably selected within the above-described ranges.

(Hardness Hw of the Stiffening Bead)

A hardness of the stiffening bead, namely a hardness Hw of a weld metal of the stiffening bead preferably satisfies the following condition (D) with respect to the steel sheet maximum hardness Hb of the steel member on which the stiffening bead is placed.

$$\text{Hardness } Hw \text{ of weld metal of stiffening bead} > \text{steel sheet maximum hardness } Hb \quad (D)$$

When the hardness Hw of the weld metal of the stiffening bead is larger than the steel sheet maximum hardness Hb, a strain concentration to a weld toe portion is suppressed, resulting in that it is possible to improve a fatigue life (times).

The hardness Hw of the weld metal of the stiffening bead is measured as follows. First, the stiffening bead-formed portion of the welded structure member is cut vertically to the weld line at the center, of the stiffening bead, in the longitudinal direction, and a cut surface is polished. Then, a hardness is measured in a direction parallel to the front surface of the steel sheet (base metal) at a position, of the cut surface, 0.2 mm deep in the sheet thickness direction from the front surface of the steel sheet (base metal). Concretely, Vickers hardness of five points is measured by a Vickers hardness tester at intervals of 0.2 mm in a weld metal direction with one point of a melting boundary at the position being a starting point, and an arithmetic mean value of measured values is calculated. Incidentally, the mean value is calculated with five points excluding the hardness of the melting boundary. A load to be applied at the measurement is preferably 1 kgf.

The steel sheet maximum hardness Hb is measured as follows. First, the stiffening bead-formed portion of the welded structure member is cut vertically to the weld line at the center, of the stiffening bead, in the longitudinal direction, and a cut surface is polished. Then, a hardness is measured in a direction parallel to the front surface of the steel sheet (base metal) at a position, of the cut surface, 0.2 mm deep in the sheet thickness direction from the front surface of the steel sheet (base metal). Concretely, Vickers hardness is measured up to a position 10 mm away from a melting boundary by a Vickers hardness tester at intervals of 0.2 mm in a base metal direction with one point of the melting boundary at the position being a starting point, and the maximum value of them is set to the steel sheet maximum hardness Hb. Incidentally, the hardness of the melting boundary is excluded when the steel sheet maximum hardness Hb is found. A load to be applied at the measurement is preferably 1 kgf. Further, the starting point when the hardness Hw of the weld metal of the stiffening bead (Vickers hardness) is measured and the starting point when the steel sheet maximum hardness Hb (Vickers hardness) is measured are made to agree with each other, and the direction in which the hardness Hw of the weld metal of the stiffening bead (Vickers hardness) is measured and the direction in which the steel sheet maximum hardness Hb (Vickers hardness) is measured are made opposite to each other (an angle formed between these directions is made 180°).

(Angle of the Stiffening Bead)

An angle γ of the stiffening bead preferably satisfies the following condition (E).

45°≤angle γ of stiffening bead≤135°  (E)

In order for the stiffening bead to exhibit the function of increasing stiffness of the steel sheet to suppress bending, the angle γ of the stiffening bead is preferably 45 to 135°. When the angle γ is less than 45° or greater than 135°, the aforementioned function of the stiffening bead decreases.

Here, when the stiffening bead is formed as shown in FIG. 5 to FIG. 9 (the turned portion in the corner portion (joined portion) is formed on one surface of each of the box products 52, 62, 72, 82, and 92), the angle γ of the stiffening bead is an angle to a tangent at a point of the fillet bead overlapping with the stiffening bead.

On the other hand, when the stiffening bead is formed as shown in FIG. 10 (the turned portion in the corner portion (joined portion) is formed on two continuing surfaces of the box product 102), the angle of the stiffening bead is an angle formed by the fillet bead and the stiffening bead on, of the two surfaces, the surface where the stiffening bead is formed.

(Other Requirements)

The arc welding conditions for forming the fillet bead and forming the stiffening bead and the composition of a welding wire used may be in accordance with ordinary methods, and are not limited to specific ones. However, it is preferred that, in terms of production, formation of the fillet bead and formation of the stiffening bead should be performed continuously using the same welding equipment. However, as long as the function of increasing stiffness of the steel sheet of the stiffening bead is secured, the welding conditions of the both and the composition of a welding wire used may be different.

Further, in the welded joint, in order to form the stiffening bead so as to overlap with the fillet bead, it is necessary that there should be an area where the stiffening bead can be formed with a required angle and a required length, height, and width in the vicinity of the welded joint.

As above, in this embodiment, it is possible to significantly suppress occurrence of fatigue fracture by a simple means of providing the stiffening bead even when the welded structure member is subjected to a cyclic vibration stress.

As above, it is possible to largely improve fatigue strength of the steel member only with the provision of the stiffening bead. However, by combining an operation of decreasing stress concentrations at the start point and the end point of welding and formation of the stiffening bead, a joint whose fatigue strength is improved can be obtained. For example, as shown in FIG. 5, FIG. 6, and FIG. 9, on the premise that the fillet bead is extended from the corner portion and the welding start point and the welding end point of the fillet bead are each disposed at a position away from the corner portion (namely, on the premise that the above-described extended bead is formed), the stiffening bead can be provided. However, such extension of the fillet bead is not necessarily needed.

Further, the present inventors confirmed that the method of this embodiment can be applied also to metal members other than the steel member. For example, it is possible to apply the method of this embodiment to aluminum members or stainless members instead of the steel member. Further, the present inventors confirmed that the method of this embodiment can be applied also to metal members of different types.

It should be noted that all of the above-described embodiments of the present invention merely illustrate examples of implementing the present invention, and the technical scope of the present invention is not to be construed in a restrictive manner by these embodiments. That is, the present invention may be implemented in various forms without departing from the technical spirit or main features thereof.

EXAMPLES

Next, examples of the present invention will be described. The conditions in the examples are one conditional example employed for confirming applicability and effects of the present invention, and the present invention is not limited to this one conditional example. The present invention can employ various conditions as long as the object of the present invention can be achieved without departing from the gist of the present invention.

Welded structure members 50, 60, 70, 80, 90, and 100 having the shapes shown in FIG. 5 to FIG. 10 were fabricated. Further, there were fabricated welded structure members that were the same as the welded structure members 50, 60, 70, 80, 90, and 100 having the shapes shown in FIG. 5 to FIG. 10 except for the point that the welding start point and the welding end point of the stiffening bead were replaced with each other. Further, there were fabricated welded structure members that were the same as the welded structure members 50, 60, 70, 80, 90, and 100 having the shapes shown in FIG. 5 to FIG. 10 except for the point that the stiffening bead was not formed.

Then, these welded structure members were each subjected to a fatigue test.

Steel members and welding materials used for the welded structure members are shown in Table 1. In Table 1, two types of steel members, Steel product A and Steel product B, were used. Incidentally, two ones having sheet thicknesses (2.3 mm and 2.6 mm) were prepared for Steel sheet A and Steel sheet B each. Further, two types of welding materials, Wire A and Wire B, were used. Wire A and Wire B each have a diameter of 1.2 mm.

TABLE 1

|  | STATIONARY STRENGTH | | | CHEMICAL COMPOSITION | | | | | | | SHEET |
| --- | --- | --- | --- | --- | --- | --- | --- | --- | --- | --- | --- |
|  | YP (MPa) | TS (MPa) | EL (%) | C | Si | Mn (mass %) | P | S | Al | N | THICKNESS (mm) |
| STEEL PRODUCT A | 370 | 480 | 25 | 0.12 | 0.02 | 0.51 | 0.02 | 0.004 | 0.03 | 0.003 | 2.3, 2.6 |
| STEEL PRODUCT B | 740 | 780 | 20 | 0.04 | 0.9 | 1.27 | 0.007 | 0.001 | 0.04 | 0.003 | 2.3, 2.6 |

TABLE 1-continued

| | STATIONARY STRENGTH | | | CHEMICAL COMPOSITION | | | | | | | SHEET |
|---|---|---|---|---|---|---|---|---|---|---|---|
| | YP (MPa) | TS (MPa) | EL (%) | C | Si | Mn | P | S | Al | N | THICKNESS (mm) |
| | | | | | | (mass %) | | | | | |
| WIRE A | — | — | | 0.08 | 0.35 | 0.85 | 0.011 | 0.005 | — | — | — |
| WIRE B | — | — | | 0.08 | 0.31 | 1.3 | 0.002 | 0.002 | — | — | — |

In this example, the box product 52 shown in FIG. 5 has a size of 300 mm×150 mm×50 mm. The channel product 51 has a size of 80 mm in flange width×75 mm in web width×80 mm in height.

In this example, the box product 62 shown in FIG. 6 has a size of 150 mm in diameter×300 mm in height (length in axial direction). The channel product 61 has a size of 80 mm in flange width×75 mm in web width of a corner portion (joined portion)×80 mm in height (maximum value).

In this example, the box product 72 shown in FIG. 7 has a size of 300 mm×100 mm×50 mm. The channel product 71 has a size of 50 mm in diameter×150 mm in height (length in axial direction).

In this example, the box product 82 shown in FIG. 8 has a size of 300 mm×150 mm×50 mm. The channel product 81 has a size of 180 mm×75 mm×56 mm.

In this example, the box product 92 shown in FIG. 9 has a size of 300 mm×100 mm×50 mm. The channel product 91 has a size of 75 mm in flange width×105 mm in web width×80 mm in height. The curvature radius of a tip of a flange of the channel product 91 is 50 mm.

In this example, the box product 102 shown in FIG. 10 has a size of 300 mm×100 mm×50 mm. The channel product 101 is one in which 30 mm of a portion having a length of 56 mm of a square-shaped steel pipe having a size of 180 mm×75 mm×56 mm is cut off from the tip.

Stiffening beads were each formed for the case where the welding start point of the stiffening bead (start position of the stiffening bead in Table 2) is on the fillet bead and the case where it is on the box product.

Further, stiffening beads were each formed for the case where the welding start point of the stiffening bead is on the fillet bead and the welding end point of the stiffening bead (end position of the stiffening bead in Table 2 to Table 12) is on the box product and for the case where the welding start point of the stiffening bead is on the fillet bead and the welding end point of the stiffening bead is on the channel product.

Further, stiffening beads were each formed for the case where the stiffening bead is formed at the turned portion in the corner portion (joined portion) and for the case where it is formed at the straight portion in the corner portion.

Further, stiffening beads were formed while changing the length La of the stiffening bead, the height Ha of the stiffening bead, and the width Wa of the stiffening bead.

The welding conditions are as follows.
<Common Welding Conditions>
Welding method: consumable electrode welding
Welding power supply: DP350 (made by DAIHEN Corporation)
Welding mode: DC-Pulse
Welding posture: downward, horizontal
Distance between chip steel sheets (projecting length): 15 mm
Shielding gas type: Ar+20% $CO_2$
Shielding gas flow rate: 20 L/min
<Formation Condition of the Fillet Bead>
Torch angle: standing angle 60° from the lower sheet, angle of advance 0°
Target position: corner of the overlapped portion
Welding rate: 80 cm/min
Welding current and voltage: a value that does not cause an undercut is set
One example:
approximately 220 A, approximately 24 V in the case of fillet arc welding with a sheet thickness of 2.3 mm)
<Formation Condition of the Stiffening Bead>
Torch angle: standing angle 90° from the steel sheet, angle of advance 0°
Target position and welding direction: welding on the lower steel sheet in a direction perpendicular to the fillet bead in the center in the width direction of the test piece with a welded metal surface of the fillet bead being a starting point
Welding rate: 50 cm/min
Welding current and voltage: a welding current that is approximately ⅔ of the fillet bead is set
One example: 150 A, 21 V in the case where the stiffening bead is disposed on the steel sheet having a sheet thickness of 2.3 mm One steel member (box product) and the other steel member (channel product) of each of the fabricated test pieces were held in an electrohydraulic fatigue test apparatus so that a load direction became the direction indicated by the outline arrow in each of FIG. 5 to FIG. 10, and they were subjected to a fatigue test with a load range being constant (constant stress range), a load ratio being −1, and a repetition frequency being 5 Hz.

The hardness Hw of the stiffening bead and the steel sheet maximum hardness Hb were measured by the respective above-described methods.

Effects of the examples are explained based on Table 2 to Table 12.

TABLE 2

| TEST PIECE SYMBOL | CATEGORY | MEMBER SHAPE | STEEL PRODUCT | WELDING MATERIAL | CHANNEL PRODUCT SHEET THICKNESS (mm) | BOX PRODUCT SHEET THICKNESS (mm) | CRACK OCCURRENCE POSITION |
|---|---|---|---|---|---|---|---|
| C1 | COMPARATIVE EXAMPLE | FIG. 5 | A | A | 2.3 | 2.3 | WELD TOE PORTION ON BOX PRODUCT SIDE OF FILLET BEAD |

TABLE 2-continued

| TEST PIECE SYMBOL | CATEGORY | MEMBER SHAPE | STEEL PRODUCT | WELDING MATERIAL | CHANNEL PRODUCT SHEET THICKNESS (mm) | BOX PRODUCT SHEET THICKNESS (mm) | CRACK OCCURRENCE POSITION |
|---|---|---|---|---|---|---|---|
| C2 | COMPARATIVE EXAMPLE | FIG. 5 | A | A | 2.3 | 2.3 | WELD TOE PORTION ON BOX PRODUCT SIDE OF FILLET BEAD |
| C3 | COMPARATIVE EXAMPLE | FIG. 5 | A | A | 2.3 | 2.3 | STIFFENING BEAD START EDGE PORTION |
| C4 | COMPARATIVE EXAMPLE | FIG. 5 | A | A | 2.3 | 2.3 | WELD TOE PORTION ON BOX PRODUCT SIDE OF FILLET BEAD |

| TEST PIECE SYMBOL | START POSITION OF STIFFENING BEAD | END POSITION OF STIFFENING BEAD | LENGTH La OF STIFFENING BEAD (mm) | WIDTH W OF FILLET BEAD (mm) | La/W (%) | HEIGHT Ha OF STIFFENING BEAD (mm) | Ha/t (%) | WIDTH Wa OF ADDED BEAD (mm) | Wa/w (%) |
|---|---|---|---|---|---|---|---|---|---|
| C1 | — | — | — | 7.1 | — | — | — | — | — |
| C2 | FILLET BEAD CORNER | ON CHANNEL PRODUCT | 20.4 | 7.3 | 279 | 2.2 | 96 | 6.1 | 84 |
| C3 | ON BOX PRODUCT | FILLET BEAD CORNER | 25.2 | 7.3 | 345 | 2.2 | 96 | 6.5 | 89 |
| C4 | CENTER OF FILLET BEAD STRAIGHT PORTION | ON BOX PRODUCT | 17.7 | 7.5 | 236 | 2.2 | 96 | 6.7 | 89 |

| TEST PIECE SYMBOL | BOX PRODUCT MAXIMUM HARDNESS Hb | STIFFENING BEAD WELD METAL HARDNESS Hw | ANGLE OF STIFFENING BEAD | FATIGUE TEST LOAD RANGE (kN) | FATIGUE LIFE (TIMES) | FATIGUE LIFE IMPROVING PERCENTAGE (%) | TEST PIECE SYMBOL AS REFERENCE |
|---|---|---|---|---|---|---|---|
| C1 | 152 | 180 | — | 3 | 230000 | — | — |
| C2 | 150 | 179 | 90° | 3 | 219000 | 95 | C1 |
| C3 | 149 | 180 | 90° | 3 | 240000 | 104 | C1 |
| C4 | 148 | 181 | 90° | 3 | 250000 | 109 | C1 |

TABLE 3

| TEST PIECE SYMBOL | CATEGORY | MEMBER SHAPE | STEEL PRODUCT | WELDING MATERIAL | CHANNEL PRODUCT SHEET THICKNESS (mm) | BOX PRODUCT SHEET THICKNESS (mm) | CRACK OCCURRENCE POSITION |
|---|---|---|---|---|---|---|---|
| D1 | INVENTION EXAMPLE | FIG. 5 | A | A | 2.3 | 2.3 | STIFFENING BEAD END EDGE PORTION |
| D2 | INVENTION EXAMPLE | FIG. 5 | A | A | 2.3 | 2.3 | STIFFENING BEAD END EDGE PORTION |
| D2 | INVENTION EXAMPLE | FIG. 5 | A | A | 2.3 | 2.3 | STIFFENING BEAD END EDGE PORTION |

| TEST PIECE SYMBOL | START POSITION OF STIFFENING BEAD | END POSITION OF STIFFENING BEAD | LENGTH La OF STIFFENING BEAD (mm) | WIDTH W OF FILLET BEAD (mm) | La/W (%) | HEIGHT Ha OF STIFFENING BEAD (mm) | Ha/t (%) | WIDTH Wa OF ADDED BEAD (mm) | Wa/W (%) |
|---|---|---|---|---|---|---|---|---|---|
| D1 | FILLET BEAD CORNER | ON BOX PRODUCT | 8.2 | 7.2 | 114 | 2.2 | 96 | 6.6 | 92 |
| D2 | FILLET BEAD CORNER | ON BOX PRODUCT | 25.1 | 7.4 | 339 | 2.4 | 104 | 6.3 | 85 |
| D2 | FILLET BEAD CORNER | ON BOX PRODUCT | 30.3 | 7.5 | 404 | 1.0 | 43 | 3.5 | 47 |

TABLE 3-continued

| TEST PIECE SYMBOL | BOX PRODUCT MAXIMUM HARDNESS Hb | STIFFENING BEAD WELD METAL HARDNESS Hw | ANGLE OF STIFFENING BEAD | FATIGUE TEST LOAD RANGE (kN) | FATIGUE LIFE (TIMES) | FATIGUE LIFE IMPROVING PERCENTAGE (%) | TEST PIECE SYMBOL AS REFERENCE |
|---|---|---|---|---|---|---|---|
| D1 | 152 | 179 | 90° | 3 | 310000 | 135 | C1 |
| D2 | 150 | 177 | 15° | 3 | 290000 | 126 | C1 |
| D2 | 148 | 178 | 100° | 3 | 280000 | 122 | C1 |

TABLE 4

| TEST PIECE SYMBOL | CATEGORY | MEMBER SHAPE | STEEL PRODUCT | WELDING MATERIAL | CHANNEL PRODUCT SHEET THICKNESS (mm) | BOX PRODUCT SHEET THICKNESS (mm) | CRACK OCCURRENCE POSITION |
|---|---|---|---|---|---|---|---|
| D4 | INVENTION EXAMPLE | FIG. 5 | A | A | 2.3 | 2.3 | STIFFENING BEAD END EDGE PORTION |
| D5 | INVENTION EXAMPLE | FIG. 5 | A | A | 2.3 | 2.3 | STIFFENING BEAD END EDGE PORTION |
| D6 | INVENTION EXAMPLE | FIG. 5 | A | A | 2.3 | 2.3 | STIFFENING BEAD END EDGE PORTION |

| TEST PIECE SYMBOL | START POSITION OF STIFFENING BEAD | END POSITION OF STIFFENING BEAD | LENGTH La OF STIFFENING BEAD (mm) | WIDTH W OF FILLET BEAD (mm) | La/W (%) | HEIGHT Ha OF STIFFENING BEAD (mm) | Ha/t (%) | WIDTH Wa OF ADDED BEAD (mm) | Wa/W (%) |
|---|---|---|---|---|---|---|---|---|---|
| D4 | FILLET BEAD CORNER | ON BOX PRODUCT | 20.2 | 7.2 | 281 | 2.2 | 96 | 6.7 | 93 |
| D5 | FILLET BEAD CORNER | ON BOX PRODUCT | 16.5 | 7.4 | 223 | 2.1 | 91 | 6.4 | 86 |
| D6 | FILLET BEAD CORNER | ON BOX PRODUCT | 25.3 | 7.1 | 356 | 2.3 | 100 | 6.7 | 94 |

| TEST PIECE SYMBOL | BOX PRODUCT MAXIMUM HARDNESS Hb | STIFFENING BEAD WELD METAL HARDNESS Hw | ANGLE OF STIFFENING BEAD | FATIGUE TEST LOAD RANGE (kN) | FATIGUE LIFE (TIMES) | FATIGUE LIFE IMPROVING PERCENTAGE (%) | TEST PIECE SYMBOL AS REFERENCE |
|---|---|---|---|---|---|---|---|
| D4 | 153 | 178 | 90° | 3 | 970000 | 422 | C1 |
| D5 | 150 | 182 | 60° | 3 | 870000 | 378 | C1 |
| D6 | 153 | 183 | 90° | 3 | 1020000 | 443 | C1 |

TABLE 5

| TEST PIECE SYMBOL | CATEGORY | MEMBER SHAPE | STEEL PRODUCT | WELDING MATERIAL | CHANNEL PRODUCT SHEET THICKNESS (mm) | BOX PRODUCT SHEET THICKNESS (mm) | CRACK OCCURRENCE POSITION |
|---|---|---|---|---|---|---|---|
| D7 | INVENTION EXAMPLE | FIG. 5 | A | A | 2.3 | 2.3 | STIFFENING BEAD END EDGE PORTION |
| D8 | INVENTION EXAMPLE | FIG. 5 | B | A | 2.3 | 2.6 | STIFFENING BEAD END EDGE PORTION |
| D9 | INVENTION EXAMPLE | FIG. 5 | B | B | 2.3 | 2.3 | STIFFENING BEAD END EDGE PORTION |

| TEST PIECE SYMBOL | START POSITION OF STIFFENING BEAD | END POSITION OF STIFFENING BEAD | LENGTH La OF STIFFENING BEAD (mm) | WIDTH W OF FILLET BEAD (mm) | La/W (%) | HEIGHT Ha OF STIFFENING BEAD (mm) | Ha/t (%) | WIDTH Wa OF ADDED BEAD (mm) | Wa/W (%) |
|---|---|---|---|---|---|---|---|---|---|
| D7 | FILLET BEAD CORNER | ON BOX PRODUCT | 35.1 | 7.3 | 481 | 2.4 | 104 | 6.4 | 88 |

TABLE 5-continued

| TEST PIECE SYMBOL | START POSITION OF STIFFENING BEAD | END POSITION OF STIFFENING BEAD | LENGTH La OF STIFFENING BEAD (mm) | WIDTH W OF FILLET BEAD (mm) | La/W (%) | HEIGHT Ha OF STIFFENING BEAD (mm) | Ha/t (%) | WIDTH Wa OF ADDED BEAD (MM) | Wa/W (%) |
|---|---|---|---|---|---|---|---|---|---|
| D8 | FILLET BEAD CORNER | ON BOX PRODUCT | 21.2 | 7.0 | 303 | 2.3 | 88 | 6.5 | 93 |
| D9 | FILLET BEAD CORNER | ON BOX PRODUCT | 20.8 | 7.6 | 274 | 2.5 | 109 | 6.6 | 87 |

| TEST PIECE SYMBOL | BOX PRODUCT MAXIMUM HARDNESS Hb | STIFFENING BEAD WELD METAL HARDNESS Hw | ANGLE OF STIFFENING BEAD | FATIGUE TEST LOAD RANGE (kN) | FATIGUE LIFE (TIMES) | FATIGUE LIFE IMPROVING PERCENTAGE (%) | TEST PIECE SYMBOL AS REFERENCE |
|---|---|---|---|---|---|---|---|
| D7 | 155 | 185 | 90° | 3 | 1150000 | 500 | C1 |
| D8 | 255 | 183 | 90° | 3 | 415000 | 180 | C1 |
| D9 | 253 | 275 | 90° | 3 | 1037000 | 451 | C1 |

TABLE 6

| TEST PIECE SYMBOL | CATEGORY | MEMBER SHAPE | STEEL PRODUCT | WELDING MATERIAL | CHANNEL PRODUCT SHEET THICKNESS (mm) | BOX PRODUCT SHEET THICKNESS (mm) | CRACK OCCURRENCE POSITION |
|---|---|---|---|---|---|---|---|
| C5 | COMPARATIVE EXAMPLE | FIG. 6 | A | A | 2.3 | 2.3 | WELD TOE PORTION ON BOX PRODUCT SIDE OF FILLET BEAD |
| D10 | INVENTION EXAMPLE | FIG. 6 | A | A | 2.3 | 2.3 | STIFFENING BEAD END EDGE PORTION |
| C6 | COMPARATIVE EXAMPLE | FIG. 6 | A | A | 2.3 | 2.3 | WELD TOE PORTION ON BOX PRODUCT SIDE OF FILLET BEAD |

| TEST PIECE SYMBOL | START POSITION OF STIFFENING BEAD | END POSITION OF STIFFENING BEAD | LENGTH La OF STIFFENING BEAD (mm) | WIDTH W OF FILLET BEAD (mm) | La/W (%) | HEIGHT Ha OF STIFFENING BEAD (mm) | Ha/t (%) | WIDTH Wa OF ADDED BEAD (MM) | Wa/W (%) |
|---|---|---|---|---|---|---|---|---|---|
| C5 | — | — | — | 7.5 | — | — | — | — | — |
| D10 | FILLET BEAD CORNER | ON BOX PRODUCT | 20.7 | 7.5 | 276 | 2.3 | 100 | 6.1 | 81 |
| C6 | ON BOX PRODUCT | FILLET BEAD CORNER | 20.5 | 7.3 | 281 | 2.4 | 104 | 6.5 | 89 |

| TEST PIECE SYMBOL | BOX PRODUCT MAXIMUM HARDNESS Hb | STIFFENING BEAD WELD METAL HARDNESS Hw | ANGLE OF STIFFENING BEAD | FATIGUE TEST LOAD RANGE (kN) | FATIGUE LIFE (TIMES) | FATIGUE LIFE IMPROVING PERCENTAGE (%) | TEST PIECE SYMBOL AS REFERENCE |
|---|---|---|---|---|---|---|---|
| C5 | 153 | 182 | — | 3 | 320000 | — | — |
| D10 | 150 | 180 | 90° | 3 | 1440000 | 450 | C5 |
| C6 | 147 | 177 | 90° | 3 | 320000 | <u>100</u> | C5 |

TABLE 7

| TEST PIECE SYMBOL | CATEGORY | MEMBER SHAPE | STEEL PRODUCT | WELDING MATERIAL | CHANNEL PRODUCT SHEET THICKNESS (mm) | BOX PRODUCT SHEET THICKNESS (mm) | CRACK OCCURRENCE POSITION |
|---|---|---|---|---|---|---|---|
| C7 | COMPARATIVE EXAMPLE | FIG. 7 | A | A | 2.6 | 2.3 | WELD TOE PORTION ON BOX PRODUCT SIDE OF FILLET BEAD |
| D11 | INVENTION EXAMPLE | FIG. 7 | A | A | 2.3 | 2.3 | STIFFENING BEAD END EDGE PORTION |

TABLE 7-continued

| | | | | | | | |
|---|---|---|---|---|---|---|---|
| C8 | COMPARATIVE EXAMPLE | FIG. 7 | A | A | 2.3 | 2.3 | WELD TOE PORTION ON BOX PRODUCT SIDE OF FILLET BEAD |

| TEST PIECE SYMBOL | START POSITION OF STIFFENING BEAD | END POSITION OF STIFFENING BEAD | LENGTH La OF STIFFENING BEAD (mm) | WIDTH W OF FILLET BEAD (mm) | La/W (%) | HEIGHT Ha OF STIFFENING BEAD (mm) | Ha/t (%) | WIDTH Wa OF ADDED BEAD (mm) | Wa/W (%) |
|---|---|---|---|---|---|---|---|---|---|
| C7 | — | — | — | 7.3 | — | — | — | — | — |
| D11 | ON FILLET BEAD | ON BOX PRODUCT | 18.4 | 7.5 | 245 | 2.4 | 104 | 6.3 | 84 |
| C8 | ON BOX PRODUCT | FILLET BEAD CORNER | 15.3 | 7.1 | 215 | 2.2 | 96 | 6.3 | 89 |

| TEST PIECE SYMBOL | BOX PRODUCT MAXIMUM HARDNESS Hb | STIFFENING BEAD WELD METAL HARDNESS Hw | ANGLE OF STIFFENING BEAD | FATIGUE TEST LOAD RANGE (kN) | FATIGUE LIFE (TIMES) | FATIGUE LIFE IMPROVING PERCENTAGE (%) | TEST PIECE SYMBOL AS REFERENCE |
|---|---|---|---|---|---|---|---|
| C7 | 150 | 179 | — | 2 | 210000 | — | — |
| D11 | 151 | 179 | 90° | 2 | 350000 | 167 | C7 |
| C8 | 153 | 182 | 90° | 2 | 200000 | <u>95</u> | C7 |

TABLE 8

| TEST PIECE SYMBOL | CATEGORY | MEMBER SHAPE | STEEL PRODUCT | WELDING MATERIAL | CHANNEL PRODUCT SHEET THICKNESS (mm) | BOX PRODUCT SHEET THICKNESS (mm) | CRACK OCCURRENCE POSITION |
|---|---|---|---|---|---|---|---|
| C9 | COMPARATIVE EXAMPLE | FIG. 8 | A | A | 2.3 | 2.3 | WELD TOE PORTION ON BOX PRODUCT SIDE OF FILLET BEAD |
| D12 | INVENTION EXAMPLE | FIG. 8 | A | A | 2.3 | 2.3 | STIFFENING BEAD END EDGE PORTION |
| C10 | COMPARATIVE EXAMPLE | FIG. 8 | A | A | 2.3 | 2.3 | WELD TOE PORTION ON BOX PRODUCT SIDE OF FILLET BEAD |

| TEST PIECE SYMBOL | START POSITION OF STIFFENING BEAD | END POSITION OF STIFFENING BEAD | LENGTH La OF STIFFENING BEAD (mm) | WIDTH W OF FILLET BEAD (mm) | La/w (%) | HEIGHT Ha OF STIFFENING BEAD (mm) | Ha/t (%) | WIDTH Wa OF ADDED BEAD (mm) | Wa/W (%) |
|---|---|---|---|---|---|---|---|---|---|
| C9 | — | — | — | 7.4 | — | — | — | — | — |
| D12 | FILLET BEAD CORNER | ON BOX PRODUCT | 20.1 | 7.3 | 275 | 2.4 | 104 | 6.1 | 84 |
| C10 | ON BOX PRODUCT | FILLET BEAD CORNER | 15.7 | 7.5 | 209 | 2.1 | 100 | 6.2 | 79 |

| TEST PIECE SYMBOL | BOX PRODUCT MAXIMUM HARDNESS Hb | STIFFENING BEAD WELD METAL HARDNESS Hw | ANGLE OF STIFFENING BEAD | FATIGUE TEST LOAD RANGE (kN) | FATIGUE LIFE (TIMES) | FATIGUE LIFE IMPROVING PERCENTAGE (%) | TEST PIECE SYMBOL AS REFERENCE |
|---|---|---|---|---|---|---|---|
| C9 | 150 | 179 | — | 5 | 460000 | — | — |
| D12 | 149 | 182 | 90° | 5 | 760000 | 165 | C9 |
| C10 | 152 | 178 | 90° | 5 | 450000 | <u>98</u> | C9 |

TABLE 9

| TEST PIECE SYMBOL | CATEGORY | MEMBER SHAPE | STEEL PRODUCT | WELDING MATERIAL | CHANNEL PRODUCT SHEET THICKNESS (mm) | BOX PRODUCT SHEET THICKNESS (mm) | CRACK OCCURRENCE POSITION |
|---|---|---|---|---|---|---|---|
| C11 | COMPARATIVE EXAMPLE | FIG. 9 | A | A | 2.3 | 2.3 | FILLET BEAD ROOT PORTION |
| C12 | COMPARATIVE EXAMPLE | FIG. 9 | A | A | 2.3 | 2.3 | FILLET BEAD ROOT PORTION |
| C13 | COMPARATIVE EXAMPLE | FIG. 9 | A | A | 2.3 | 2.3 | FILLET BEAD ROOT PORTION |

| TEST PIECE SYMBOL | START POSITION OF STIFFENING BEAD | END POSITION OF STIFFENING BEAD | LENGTH La OF STIFFENING BEAD (mm) | WIDTH W OF FILLET BEAD (mm) | La/W (%) | HEIGHT Ha OF STIFFENING BEAD (mm) | Ha/t (%) | WIDTH Wa OF ADDED BEAD (mm) | Wa/W (%) |
|---|---|---|---|---|---|---|---|---|---|
| C11 | — | — | — | 10.4 | — | — | — | — | — |
| C12 | ON FILLET BEAD | ON CHANNEL PRODUCT | 25.3 | 10.2 | 248 | 2.3 | 100 | 6.3 | 62 |
| C13 | ON BOX PRODUCT | ON FILLET BEAD | 18.3 | 9.1 | 201 | 2.5 | 109 | 6.4 | 70 |

| TEST PIECE SYMBOL | BOX PRODUCT MAXIMUM HARDNESS Hb | STIFFENING BEAD WELD METAL HARDNESS Hw | ANGLE OF STIFFENING BEAD | FATIGUE TEST LOAD RANGE (kN) | FATIGUE LIFE (TIMES) | FATIGUE LIFE IMPROVING PERCENTAGE (%) | TEST PIECE SYMBOL AS REFERENCE |
|---|---|---|---|---|---|---|---|
| C11 | 153 | 182 | — | 15 | 340000 | — | — |
| C12 | 149 | 181 | 90° | 15 | 350000 | 103 | C11 |
| C13 | 150 | 178 | 90° | 15 | 320000 | 94 | C11 |

TABLE 10

| TEST PIECE SYMBOL | CATEGORY | MEMBER SHAPE | STEEL PRODUCT | WELDING MATERIAL | CHANNEL PRODUCT SHEET THICKNESS (mm) | BOX PRODUCT SHEET THICKNESS (mm) | CRACK OCCURRENCE POSITION |
|---|---|---|---|---|---|---|---|
| D13 | INVENTION EXAMPLE | FIG. 9 | A | A | 2.3 | 2.3 | END EDGE PORTION OF STIFFENING BEAD |
| D14 | INVENTION EXAMPLE | FIG. 9 | A | A | 2.3 | 2.3 | END EDGE PORTION OF STIFFENING BEAD |
| D15 | INVENTION EXAMPLE | FIG. 9 | A | A | 2.3 | 2.3 | END EDGE PORTION OF STIFFENING BEAD |
| D16 | INVENTION EXAMPLE | FIG. 9 | A | A | 2.3 | 2.6 | END EDGE PORTION OF STIFFENING BEAD |

| TEST PIECE SYMBOL | START POSITION OF STIFFENING BEAD | END POSITION OF STIFFENING BEAD | LENGTH La OF STIFFENING BEAD (mm) | WIDTH W OF FILLET BEAD (mm) | La/W (%) | HEIGHT Ha OF STIFFENING BEAD (mm) | Ha/t (%) | WIDTH Wa OF ADDED BEAD (mm) | Wa/W (%) |
|---|---|---|---|---|---|---|---|---|---|
| D13 | ON FILLET BEAD | ON BOX PRODUCT | 12.3 | 10.0 | 123 | 2.3 | 100 | 6.7 | 67 |
| D14 | ON FILLET BEAD | ON BOX PRODUCT | 34.9 | 10.2 | 342 | 2.3 | 100 | 6.1 | 60 |
| D15 | ON FILLET BEAD | ON BOX PRODUCT | 25.5 | 10.5 | 243 | 1.1 | 48 | 4.1 | 39 |
| D16 | ON FILLET BEAD | ON BOX PRODUCT | 23.2 | 10.6 | 219 | 2.4 | 92 | 6.8 | 64 |

TABLE 10-continued

| TEST PIECE SYMBOL | BOX PRODUCT MAXIMUM HARDNESS Hb | STIFFENING BEAD WELD METAL HARDNESS Hw | ANGLE OF STIFFENING BEAD | FATIGUE TEST LOAD RANGE (kN) | FATIGUE LIFE (TIMES) | FATIGUE LIFE IMPROVING PERCENTAGE (%) | TEST PIECE SYMBOL AS REFERENCE |
|---|---|---|---|---|---|---|---|
| D13 | 152 | 180 | 90° | 15 | 430000 | <u>126</u> | C11 |
| D14 | 150 | 180 | <u>15°</u> | 15 | 415000 | <u>122</u> | C11 |
| D15 | 151 | 179 | 90° | 15 | 430000 | <u>126</u> | C11 |
| D16 | 152 | 182 | 90° | 15 | 830000 | 244 | C11 |

TABLE 11

| TEST PIECE SYMBOL | CATEGORY | MEMBER SHAPE | STEEL PRODUCT | WELDING MATERIAL | CHANNEL PRODUCT SHEET THICKNESS (mm) | BOX PRODUCT SHEET THICKNESS (mm) | CRACK OCCURRENCE POSITION |
|---|---|---|---|---|---|---|---|
| D17 | INVENTION EXAMPLE | FIG. 9 | A | A | 2.3 | 2.3 | END EDGE PORTION OF STIFFENING BEAD |
| D18 | INVENTION EXAMPLE | FIG. 9 | A | A | 2.3 | 2.3 | END EDGE PORTION OF STIFFENING BEAD |
| D19 | INVENTION EXAMPLE | FIG. 9 | B | A | 2.3 | 2.3 | END EDGE PORTION OF STIFFENING BEAD |
| D20 | INVENTION EXAMPLE | FIG. 9 | B | B | 2.3 | 2.3 | END EDGE PORTION OF STIFFENING BEAD |

| TEST PIECE SYMBOL | START POSITION OF STIFFENING BEAD | END POSITION OF STIFFENING BEAD | LENGTH La OF STIFFENING BEAD (mm) | WIDTH W OF FILLET BEAD (mm) | La/W (%) | HEIGHT Ha OF STIFFENING BEAD (mm) | Ha/t (%) | WIDTH Wa OF ADDED BEAD (mm) | Wa/W (%) |
|---|---|---|---|---|---|---|---|---|---|
| D17 | ON FILLET BEAD | ON BOX PRODUCT | 35.5 | 10.6 | 335 | 2.4 | 104 | 6.7 | 63 |
| D18 | ON FILLET BEAD | ON BOX PRODUCT | 30.0 | 10.1 | 297 | 2.3 | 100 | 6.4 | 63 |
| D19 | ON FILLET BEAD | ON BOX PRODUCT | 30.2 | 10.5 | 288 | 2.3 | 100 | 6.4 | 61 |
| D20 | ON FILLET BEAD | ON BOX PRODUCT | 30.5 | 10.5 | 290 | 2.1 | 91 | 6.5 | 62 |

| TEST PIECE SYMBOL | BOX PRODUCT MAXIMUM HARDNESS Hb | STIFFENING BEAD WELD METAL HARDNESS Hw | ANGLE OF STIFFENING BEAD | FATIGUE TEST LOAD RANGE (kN) | FATIGUE LIFE (TIMES) | FATIGUE LIFE IMPROVING PERCENTAGE (%) | TEST PIECE SYMBOL AS REFERENCE |
|---|---|---|---|---|---|---|---|
| D17 | 149 | 183 | 90° | 15 | 1130000 | 332 | C11 |
| D18 | 153 | 184 | 90° | 15 | 970000 | 285 | C11 |
| D19 | 252 | 182 | 90° | 15 | 580000 | 171 | C11 |
| D20 | 256 | 274 | 90° | 15 | 1210000 | 356 | C11 |

TABLE 12

| TEST PIECE SYMBOL | CATEGORY | MEMBER SHAPE | STEEL PRODUCT | WELDING MATERIAL | CHANNEL PRODUCT SHEET THICKNESS (mm) | BOX PRODUCT SHEET THICKNESS (mm) | CRACK OCCURRENCE POSITION |
|---|---|---|---|---|---|---|---|
| C14 | COMPARATIVE EXAMPLE | FIG. 10 | A | A | 2.3 | 2.6 | WELD TOE PORTION ON BOX PRODUCT SIDE OF FILLET BEAD |
| D21 | INVENTION EXAMPLE | FIG. 10 | A | A | 2.3 | 2.6 | STIFFENING BEAD END EDGE PORTION |
| C15 | COMPARATIVE EXAMPLE | FIG. 10 | A | A | 2.3 | 2.6 | WELD TOE PORTION ON BOX PRODUCT SIDE OF FILLET BEAD |

TABLE 12-continued

| TEST PIECE SYMBOL | START POSITION OF STIFFENING BEAD | END POSITION OF STIFFENING BEAD | LENGTH La OF STIFFENING BEAD (mm) | WIDTH W OF FILLET BEAD (mm) | La/W (%) | HEIGHT Ha OF STIFFENING BEAD (mm) | Ha/t (%) | WIDTH Wa OF ADDED BEAD | Wa/W (%) |
|---|---|---|---|---|---|---|---|---|---|
| C14 | — | — | — | 9.3 | — | — | — | — | — |
| D21 | FILLET BEAD CORNER | ON BOX PRODUCT | 30.4 | 9.5 | 320 | 2.1 | 81 | 6.3 | 66 |
| C15 | ON BOX PRODUCT | FILLET BEAD CORNER | 19.1 | 9.5 | 201 | 2.2 | 85 | 6.3 | 66 |

| TEST PIECE SYMBOL | BOX PRODUCT MAXIMUM HARDNESS Hb | STIFFENING BEAD WELD METAL HARDNESS Hw | ANGLE OF STIFFENING BEAD | FATIGUE TEST LOAD RANGE (kN) | FATIGUE LIFE (TIMES) | FATIGUE LIFE IMPROVING PERCENTAGE (%) | TEST PIECE SYMBOL AS REFERENCE |
|---|---|---|---|---|---|---|---|
| C14 | 150 | 179 | — | 5 | 210000 | — | — |
| D21 | 151 | 182 | 90° | 5 | 1190000 | 567 | C14 |
| C15 | 150 | 183 | 90° | 5 | 200000 | 95 | C14 |

Test piece symbols C1, C5, C7, C9, C11, and C14 indicate results of the welded structure members each having no stiffening bead formed thereon with respect to the welded structure members 50, 60, 70, 80, 90, and 100 shown in FIG. 5, FIG. 6, FIG. 7, FIG. 8, FIG. 9, and FIG. 10 respectively. Based on the fatigue life of these welded structure members, the effect of the stiffening bead was verified. Based on the fatigue lives of the test piece symbols described in "TEST PIECE SYMBOL AS REFERENCE" in Table 2 to Table 12, "FATIGUE LIFE IMPROVING PERCENTAGE" was calculated. In this example, it was determined that when "FATIGUE LIFE IMPROVING PERCENTAGE" exceeds 120%, the effect by the stiffening bead exists.

D1 to D9 each indicate an evaluation of the effect of the stiffening bead targeted at the welded structure member 50 shown in FIG. 5. On the welded structure member 50, no stiffening beads were formed, so that a crack occurred in the weld toe portions on the box product 52 side in the bent portions of the fillet bead 53 (see "CRACK OCCURRENCE POSITION" of C1). Therefore, it is necessary to increase the fatigue life in these places by the stiffening beads 55A and 55B. Thus, the stiffening beads 55A and 55B were formed in a manner that the positions of the bent portions of the fillet bead 53 were set to their welding start position and the front surface of the box product 52 was set to their welding end position (see "FILLET BEAD CORNER" of "START POSITION OF STIFFENING BEAD" and "ON BOX PRODUCT" of "END POSITION OF STIFFENING BEAD" of D1 to D9).

As indicated in D1 to D9, the stiffening beads 55A and 55B were formed as above, and thereby the fatigue life was increased and the crack occurrence position changed to the end edge portions of the stiffening beads 55A and 55B from the toe portions of the fillet bead 53 (see "STIFFENING BEAD END EDGE PORTION" of "CRACK OCCURRENCE POSITION" of D1 to D9).

Further, as indicated in D1 to D3, and D8, unless the conditions of (A) to (E) described above are satisfied, an improved margin of the fatigue life tends to decrease.

Concretely, in D1, the length La of the stiffening bead is not two times or more of the width W of the fillet bead ("La/W" of D1 does not become 200% or more, which does not satisfy the condition of (A)). In D2, the angle γ of the stiffening bead is not in the range of 45° to 135° ("ANGLE OF STIFFENING BEAD" of D2 does not become 45° to 135°, which does not satisfy the condition of (E)). In D3, the height Ha of the stiffening bead is not 0.5 times or more of the thickness t of the steel member on which the stiffening bead is formed, and the width Wa of the stiffening bead is not 0.5 times or more of the width W of the fillet bead ("Ha/t" of D3 does not become 50% or more, which does not satisfy the condition of (B), and "Wa/W" of D3 does not become 50% or more, which does not satisfy the condition of (C)). In D8, the hardness Hw (of the weld metal) of the stiffening bead does not exceed the maximum hardness of the box product where a crack occurs (steel sheet maximum hardness Hb) ("STIFFENING BEAD WELD METAL HARDNESS Hw" of D8 does not exceed "BOX PRODUCT MAXIMUM HARDNESS Hb," which does not satisfy the condition of (D)). However, in all the cases, the fatigue life improving percentage exceeded 120%.

D10 indicates an evaluation of the effect of the stiffening bead targeted at the welded structure member 60 shown in FIG. 6. On the welded structure member 60, no stiffening beads were formed, so that a crack occurred in the weld toe portions on the box product 62 side in the bent portions of the fillet bead 63 (see "CRACK OCCURRENCE POSITION" of C5). Therefore, it is necessary to increase the fatigue life in these places by the stiffening beads 65A and 65B. Thus, the stiffening beads 65A and 65B were formed in a manner that the bent portions of the fillet bead 63 were set to their welding start position and the front surface of the box product 62 was set to their welding end position (see "FILLET BEAD CORNER" of "START POSITION OF STIFFENING BEAD" and "ON BOX PRODUCT" of "END POSITION OF STIFFENING BEAD" of D10).

As indicated in D10, the stiffening beads 65A and 65B were formed as above, and thereby the fatigue life was increased and the crack occurrence position changed to the end edge portions of the stiffening beads 65A and 65B from the toe portions of the fillet bead 63 (see "STIFFENING BEAD END EDGE PORTION" of "CRACK OCCURRENCE POSITION" of D10).

Incidentally, it was confirmed that unless the conditions of (A) to (E) described above are satisfied, an improved margin of the fatigue life tends to decrease also in the welded structure member 60 shown in FIG. 6, which is not shown in the table.

D11 indicates an evaluation of the effect of the stiffening bead targeted at the welded structure member 70 shown in FIG. 7. On the welded structure member 70, no stiffening bead was formed, so that a crack occurred in the weld toe portion on the box product 72 side at the point directly opposite the point of the fillet bead 73 where a load is applied (see "CRACK OCCURRENCE POSITION" of C7). Thus, the stiffening bead 74 was formed in a manner that this point of the fillet bead 73 was set to its welding start position and the front surface of the box product 72 was set to its welding end position (see "ON FILLET BEAD" of "START POSITION OF STIFFENING BEAD" and "ON BOX PRODUCT" of "END POSITION OF STIFFENING BEAD" of D11).

As indicated in D11, the stiffening bead 74 was formed as above, and thereby the fatigue life was increased and the crack occurrence position changed to the end edge portion of the stiffening bead 74 from the toe portion of the fillet bead 73 (see "STIFFENING BEAD END EDGE PORTION" of "CRACK OCCURRENCE POSITION" of D11).

Incidentally, it was confirmed that unless the conditions of (A) to (E) described above are satisfied, an improved margin of the fatigue life tends to decrease also in the welded structure member 70 shown in FIG. 7, which is not shown in the table.

D12 indicates an evaluation of the effect of the stiffening bead targeted at the welded structure member 80 shown in FIG. 8. On the welded structure member 80, no stiffening beads were formed, so that a crack occurred in the weld toe portions on the box product 82 side in the bent portions of the fillet bead 83 (see "CRACK OCCURRENCE POSITION" of C9). Therefore, it is necessary to increase the fatigue life in these places by the stiffening beads 84A, 84B, and 84C. Thus, the stiffening beads 84A, 84B, and 84C were formed in a manner that the bent portions of the fillet bead 83 were set to their welding start position and the front surface of the box product 82 was set to their welding end position (see "FILLET BEAD CORNER" of "START POSITION OF STIFFENING BEAD" and "ON BOX PRODUCT" of "END POSITION OF STIFFENING BEAD" of D12). Incidentally, similarly to the other stiffening beads, another stiffening bead was formed also in the other invisible bent portion hidden in FIG. 8.

As indicated in D12, the stiffening beads 84A, 84B, and 84C were formed as above, and thereby the fatigue life was increased and the crack occurrence position changed to the end edge portions of the stiffening beads 84A, 84B, and 84C from the toe portion of the fillet bead 83 (see "STIFFENING BEAD END EDGE PORTION" of "CRACK OCCURRENCE POSITION" of D12).

Incidentally, it was confirmed that unless the conditions of (A) to (E) described above are satisfied, an improved margin of the fatigue life tends to decrease also in the welded structure member 80 shown in FIG. 8, which is not shown in the table.

D13 to D20 each indicate an evaluation of the effect of the stiffening bead targeted at the welded structure member 90 shown in FIG. 9. On the welded structure member 90, no stiffening bead was formed, so that a crack occurred from the root portion in the center portion in the direction along the weld line of the fillet bead 93 (see "CRACK OCCURRENCE POSITION" of C11). Therefore, it is necessary to increase the fatigue life in this place by the stiffening bead 95. Thus, the stiffening bead 95 was formed in a manner that the center portion in the direction along the weld line of the fillet bead 93 was set to its welding start position and the front surface of the box product 92 was set to its welding end position (see "ON FILLET BEAD" of "START POSITION OF STIFFENING BEAD" and "ON BOX PRODUCT" of "END POSITION OF STIFFENING BEAD" of D13 to D20).

As indicated in D13 to D20, the stiffening bead 95 was formed as above, and thereby the fatigue life was increased and the crack occurrence position changed to the end edge portion of the stiffening bead 95 from the root portion side in the center portion of the fillet bead 93 (see "STIFFENING BEAD END EDGE PORTION" of "CRACK OCCURRENCE POSITION" of D13 to D20).

Further, as indicated in D13 to D15, and D19, unless the conditions of (A) to (E) described above are satisfied, an improved margin of the fatigue life tends to decrease.

Concretely, in D13, the length La of the stiffening bead is not two times or more of the width W of the fillet bead ("La/W" of D13 does not become 200% or more, which does not satisfy the condition of (A)). In D14, the angle γ of the stiffening bead is not in the range of 45° to 135° ("ANGLE OF STIFFENING BEAD" of D14 does not become 45° to 135°, which does not satisfy the condition of (E)). In D15, the height Ha of the stiffening bead is not 0.5 times or more of the thickness t of the steel member on which the stiffening bead is formed, and the width Wa of the stiffening bead is not 0.5 times or more of the width W of the fillet bead ("Ha/t" of D15 does not become 50% or more, which does not satisfy the condition of (B), and "Wa/W" of D15 does not become 50% or more, which does not satisfy the condition of (C)). In D19, the hardness Hw (of the weld metal) of the stiffening bead does not exceed the maximum hardness of the box product where a crack occurs (steel sheet maximum hardness Hb) ("STIFFENING BEAD WELD METAL HARDNESS Hw" of D19 does not exceed "BOX PRODUCT MAXIMUM HARDNESS Hb," which does not satisfy the condition of (D)). However, in all the cases, the fatigue life improving percentage exceeded 120%.

D21 indicates an evaluation of the effect of the stiffening bead targeted at the welded structure member 100 shown in FIG. 10. On the welded structure member 100, no stiffening beads were formed, so that a crack occurred in the weld toe portions on the box product 102 side in the bent portions abutted on the sheet surface portion of the channel product 101 of the bent portions of the fillet bead 103 (see "CRACK OCCURRENCE POSITION" of C14). Therefore, it is necessary to increase the fatigue life in these places by the stiffening beads 104A and 104B. Thus, the stiffening beads 104A and 104B were formed in a manner that the bent portions of the fillet bead 103 were set to their welding start position and the front surface of the box product 102 was set to their welding end position (see "FILLET BEAD CORNER" of "START POSITION OF STIFFENING BEAD" and "ON BOX PRODUCT" of "END POSITION OF STIFFENING BEAD" of D21).

As indicated in D21, the stiffening beads 104A and 104B were formed as above, and thereby the fatigue life was increased and the crack occurrence position changed to the end edge portions of the stiffening beads 104A and 104B from the toe portions of the fillet bead 103 (see "STIFFENING BEAD END EDGE PORTION" of "CRACK OCCURRENCE POSITION" of D21).

Incidentally, it was confirmed that unless the conditions of (A) to (E) described above are satisfied, an improved margin of the fatigue life tends to decrease also in the welded structure member 100 shown in FIG. 10, which is not shown in the table.

C2 indicates results of the one in which the welding end point of the stiffening bead was set not to the box product 52 side where a crack occurs when a load is applied to the welded structure member 50 with no stiffening beads formed thereon but to the channel product 51 side with respect to the welded structure member 50 shown in FIG. 5.

C3 indicates results of the one in which the welding start point and the welding end point of the stiffening bead were replaced with each other with respect to the welded structure member 50 shown in FIG. 5.

C4 indicates results of the one in which the stiffening bead was not formed in the bent portions of the fillet bead 53, but the stiffening bead was formed, of the region of the fillet bead 53, in the center region in the width direction of the web of the channel product 51 in a manner that a place in the fillet bead 53 was set to its welding start position and the front surface of the box product 52 was set to its welding end position with respect to the welded structure member 50 shown in FIG. 5.

In all the cases of C2 to C4, the fatigue life improving percentage fell below 120%.

C6 indicates results of the one in which the welding start point and the welding end point of the stiffening bead were replaced with each other with respect to the welded structure member 60 shown in FIG. 6. C8 indicates results of the one in which the welding start point and the welding end point of the stiffening bead were replaced with each other with respect to the welded structure member 70 shown in FIG. 7. C10 indicates results of the one in which the welding start point and the welding end point of the stiffening bead were replaced with each other with respect to the welded structure member 80 shown in FIG. 8.

In all the cases of C6, C8, and C10, the fatigue life improving percentage fell below 120%.

C12 indicates results of the one in which the welding end point of the stiffening bead was set not to the box product 92 side where a crack occurs when a load is applied to the welded structure member 90 with no stiffening bead formed thereon but to the channel product 91 side with respect to the welded structure member 90 shown in FIG. 9.

C13 indicates results of the one in which the welding start point and the welding end point of the stiffening bead were replaced with each other with respect to the welded structure member 90 shown in FIG. 9.

In both the cases of C12 and C13, the fatigue life improving percentage fell below 120%.

C15 indicates results of the one in which the welding start point and the welding end point of the stiffening bead were replaced with each other with respect to the welded structure member 100 shown in FIG. 10.

In the case of C15, the fatigue life improving percentage fell below 120%.

INDUSTRIAL APPLICABILITY

The present invention can be used in an industrial field using welding such as machine industry, for example.

The invention claimed is:

1. A method of forming a fillet arc welded joint by fillet arc welding a targeted corner portion,
wherein the targeted corner portion is an edge portion of an abutted portion of at least one of a sheet surface portion and a sheet thickness portion of a first metal member and a sheet surface portion of a second metal member,
the targeted corner portion has a turned portion,
the method comprising:
forming a fillet bead with respect to a region containing the turned portion of the targeted corner portion by the fillet arc welding, while the turned portion is positioned at a place between the ends of the fillet bead; and
forming a stiffening bead by an arc welding so that one of a welding start point and a welding end point of the stiffening bead overlaps with the fillet bead formed at the turned portion, and the other of the welding start point and the welding end point of the stiffening bead overlaps with the first metal member or the second metal member, wherein
the first metal member or the second metal member that is overlapped with the other of the welding start point and the welding end point of the stiffening bead is determined by:
before forming the stiffening bead, between a first test metal member and a second test metal member constituting a load test fillet arc welded joint formed under the same condition as that of the fillet arc welded joint except for the point that the stiffening bead is not formed, determining a test metal member in which a larger tensile stress occurs when a cyclic load expected to be applied to the fillet arc welded joint is applied to the load test fillet arc welded joint, and
selecting one of the first metal member and the second metal member, based on the test metal member in which the larger tensile stress occurs, as a metal member overlapping with the other of the welding start point and the welding end point of the stiffening bead, and
at least one of the first metal member and the second metal member is formed of a metal sheet having a sheet thickness of 3.2 mm or less.

2. The method of forming the fillet arc welded joint according to claim 1, wherein
the stiffening bead is formed so that the welding start point of the stiffening bead overlaps with the fillet bead and the welding end point of the stiffening bead overlaps with another weld bead which is formed separately from the fillet bead.

3. The method of forming the fillet arc welded joint according to claim 1, wherein
the turned portion contains at least one of a bent portion and a curved portion.

4. The method of forming the fillet arc welded joint according to claim 1, wherein
before forming the stiffening bead, a region of the turned portion where a maximum principal stress becomes larger than at a welding start position of the fillet bead is determined as a region overlapping with the one of the welding start point and the welding end point of the stiffening bead when the cyclic load is applied to the load test fillet arc welded joint formed under the same condition as that of the fillet arc welded joint except for the point that the stiffening bead is not formed.

5. The method of forming the fillet arc welded joint according to claim 1, wherein
before forming the stiffening bead, a region of the turned portion where a maximum principal stress becomes maximum is determined as a region overlapping with the one of the welding start point and the welding end point of the stiffening bead when the cyclic load is applied to the load test fillet arc welded joint formed under the same condition as that of the fillet arc welded joint except for the point that the stiffening bead is not formed.

6. The method of forming the fillet arc welded joint according to claim 1, wherein a hardness Hw of the stiffening bead exceeds a maximum hardness Hb of a metal member, of the first metal member and the second metal member, which overlaps with the other of the welding start point and the welding end point of the stiffening bead.

7. The method of forming the fillet arc welded joint according to claim 1, wherein
a length La of the stiffening bead is two times or more of a width W of the fillet bead,
a height Ha of the stiffening bead is 0.5 times or more of a thickness t of a metal member, of the first metal member and the second metal member, which overlaps with the other of the welding start point and the welding end point of the stiffening bead,
a width Wa of the stiffening bead is 0.5 times or more of the width W of the fillet bead, and
an angle γ of the stiffening bead with respect to the fillet bead is not less than 45° nor more than 135°.

8. A fillet arc welded joint formed by fillet arc welding a targeted corner portion, wherein the targeted corner portion is an edge portion of an abutted portion of at least one of a sheet surface portion and a sheet thickness portion of a first metal member and a sheet surface portion of a second metal member,
and the targeted corner portion has a turned portion,
the fillet arc welded join comprising:
a fillet bead formed with respect to a region containing the turned portion of the targeted corner portion by the fillet arc welding, while the turned potion is positioned at a place between the ends of the fillet bead; and
a stiffening bead formed by an arc welding, wherein
the stiffening bead is formed so that one of a welding start point and a welding end point of the stiffening bead overlaps with the fillet bead formed at the turned portion, and the other of the welding start point and the welding end point of the stiffening bead overlaps with the first metal member or the second metal member, and,
the first metal member or the second metal member that is overlapped with the other of the welding start point and the welding end point of the stiffening bead is determined by:
before forming the stiffening bead, between a first test metal member and a second test metal member constituting a load test fillet arc welded joint formed under the same condition as that of the fillet arc welded joint except for the point that the stiffening bead is not formed, determining a test metal member in which a larger tensile stress occurs when a cyclic load expected to be applied to the fillet arc welded joint is applied to the load test fillet arc welded joint, and
selecting one of the first metal member and the second metal member, based on the test metal member in which the larger tensile stress occurs, as a metal member overlapping with the other of the welding start point and the welding end point of the stiffening bead, and at least one of the first metal member and the second metal member is formed of a metal sheet having a sheet thickness of 3.2 mm or less.

9. The fillet arc welded joint according to claim 8, wherein the welding start point of the stiffening bead is at a position overlapping with the fillet bead and the welding end point of the stiffening bead overlaps with another weld bead which is formed separately from the fillet bead.

10. The fillet arc welded joint according to claim 8, wherein
the turned portion contains at least one of a bent portion and a curved portion.

11. The fillet arc welded joint according to claim 8, wherein
before forming the stiffening bead, a region of the turned portion where a maximum principal stress becomes larger than at a welding start position of the fillet bead is determined as a region overlapping with the one of the welding start point and the welding end point of the stiffening bead when the cyclic load is applied to the load test fillet arc welded joint formed under the same condition as that of the fillet arc welded joint except for the point that the stiffening bead is not formed.

12. The fillet arc welded joint according to claim 8, wherein
before forming the stiffening bead a region of the turned portion where a maximum principal stress becomes maximum is determined as a region overlapping with the one of the welding start point and the welding end point of the stiffening bead when the cyclic load is applied to the load test fillet arc welded joint formed under the same condition as that of the fillet arc welded joint except for the point that the stiffening bead is not formed.

13. The fillet arc welded joint according to claim 8, wherein
a hardness Hw of the stiffening bead exceeds a maximum hardness Hb of a metal member, of the first metal member and the second metal member, which overlaps with the other of the welding start point and the welding end point of the stiffening bead.

14. The fillet arc welded joint according to claim 8, wherein
a length La of the stiffening bead is two times or more of a width W of the fillet bead,
a height Ha of the stiffening bead is 0.5 times or more of a thickness t of a metal member, of the first metal member and the second metal member, which overlaps with the other of the welding start point and the welding end point of the stiffening bead,
a width Wa of the stiffening bead is 0.5 times or more of the width W of the fillet bead, and
an angle γ of the stiffening bead with respect to the fillet bead is not less than 45° nor more than 135°.

* * * * *